United States Patent [19]

Magill

[11] 4,218,034
[45] Aug. 19, 1980

[54] INDUSTRIAL AND URBAN AIRPORT COMPLEX WITH SPECIAL CARGO-HANDLING FACILITIES

[76] Inventor: John W. Magill, 664 N. Michigan Ave., Chicago, Ill. 60611

[21] Appl. No.: 874,502

[22] Filed: Feb. 2, 1978

[51] Int. Cl.² .............................. B64F 1/32; B64F 1/36
[52] U.S. Cl. ....................................... 244/114 R; 52/30; 52/236.4; 244/137 R; 414/281; 414/285
[58] Field of Search ................ 244/114 R, 137 R; 214/58, 16 B, 16.4 A, 38 BA, 38 BB; 52/30, 33, 236.3, 236.4; 104/172 C; 198/799, 864, 812, 607; 414/277–285, 387, 402

[56] References Cited

U.S. PATENT DOCUMENTS

| | | | |
|---|---|---|---|
| 3,307,493 | 3/1967 | Keller et al. | 198/864 X |
| 3,355,007 | 11/1967 | Middlesworth | 198/812 X |
| 3,371,769 | 3/1968 | Beninger | 198/607 X |
| 3,568,862 | 3/1971 | Walkhoff et al. | 214/38 BA X |
| 3,578,145 | 5/1971 | Kuehl | 198/799 |
| 3,684,079 | 8/1972 | Kuehl | 198/799 X |
| 3,916,588 | 11/1975 | Magill | 244/114 R X |
| 3,978,995 | 9/1976 | Zollinger et al. | 214/16.4 A |
| 4,005,787 | 2/1977 | Sleep | 214/58 |

FOREIGN PATENT DOCUMENTS 1199682 12/1959 France ........................................ 52/30

*Primary Examiner*—Barry L. Kelmachter
*Attorney, Agent, or Firm*—Gerlach & O'Brien

[57] ABSTRACT

An airport complex comprising a main multi-level passenger terminal having peripheral gates for the enplaning and deplaning of passengers and cargo. A cargo building which is disposed in close proximity to the passenger terminal greatly shortens the time factor which usually is involved in transporting cargo to and from the passenger terminal. The airport complex is designed principally to accommodate ultra large aircraft of the jet-propelled type and novel facilities are provided for routing enplaning cargo on a priority basis from an arriving jet to a departing jet through cargo-handling facilities which are disposed within the passenger terminal, and also for routing enplaning cargo from the cargo building to a departing jet through the passenger terminal, likewise on a priority basis. Novel facilities are also provided for routing deplaning cargo from an arriving jet to the cargo building for various subsequent distribution, as, for example, inspection at a customs station, a sorting station, and breakdown to a flight departure as enplaning cargo via the passenger terminal, or as terminating cargo for remote delivery in the environs of the airport complex. A principal feature of such complex resides in the use of a towline cargo-handling system which cooperates with a series of power-driven cargo conveyors which, in turn, cooperate selectively with elevator mechanisms whereby both enplaning and deplaning cargo may be routed variously, the entire system being computerized for programmed control thereof. Provision is also made for the handling of baggage, mail, freight, and other items.

14 Claims, 37 Drawing Figures

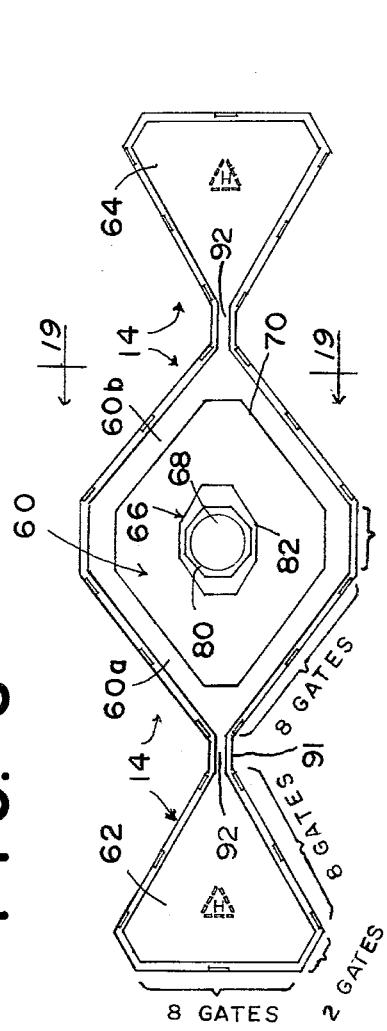
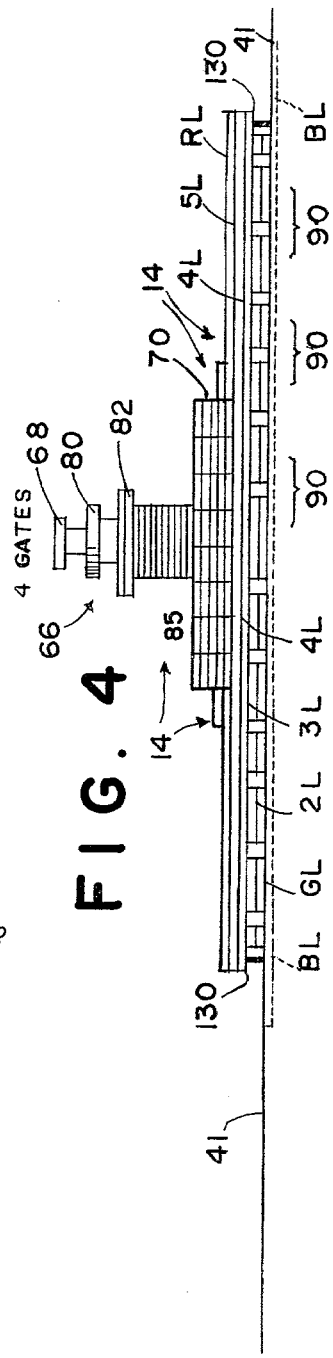
FIG. 3
FIG. 4

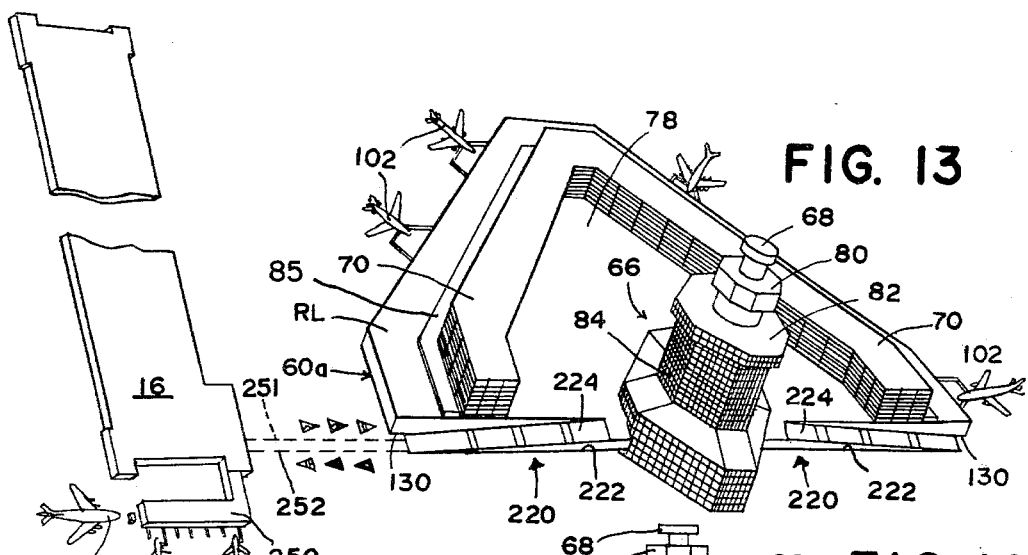
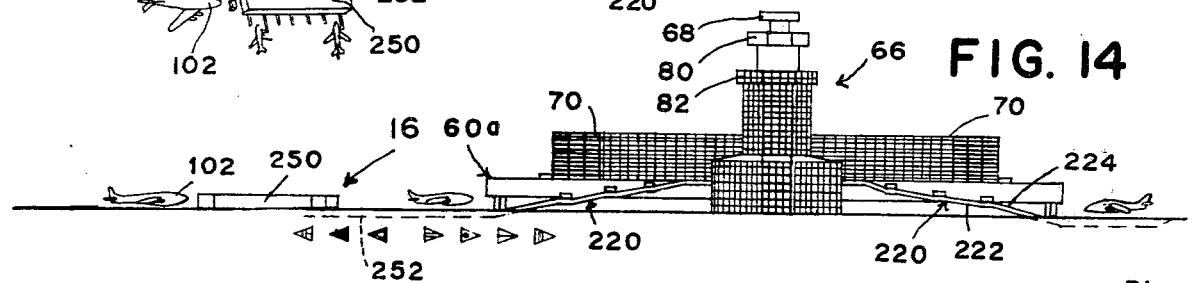
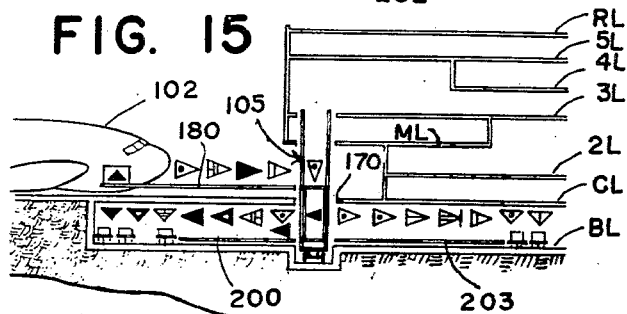
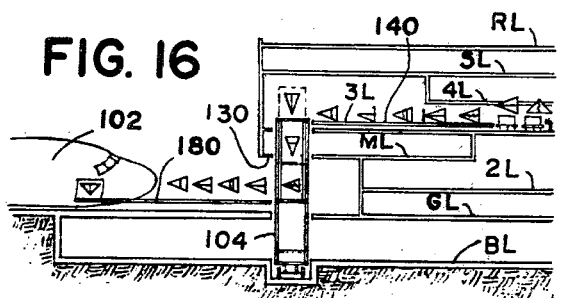
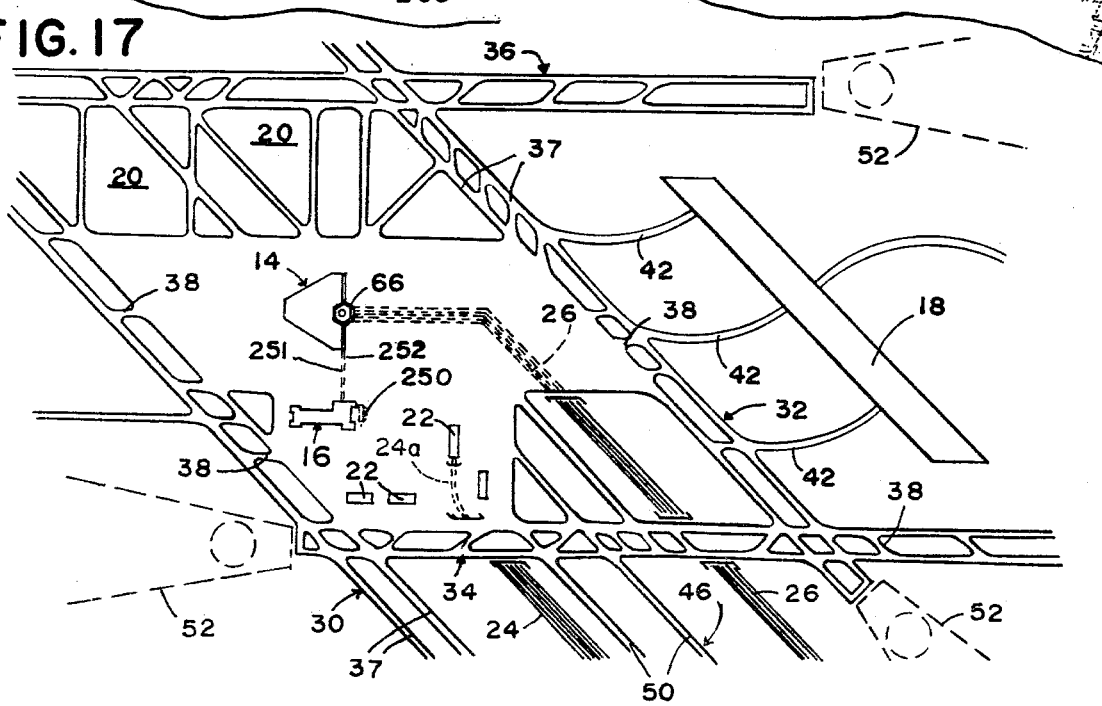

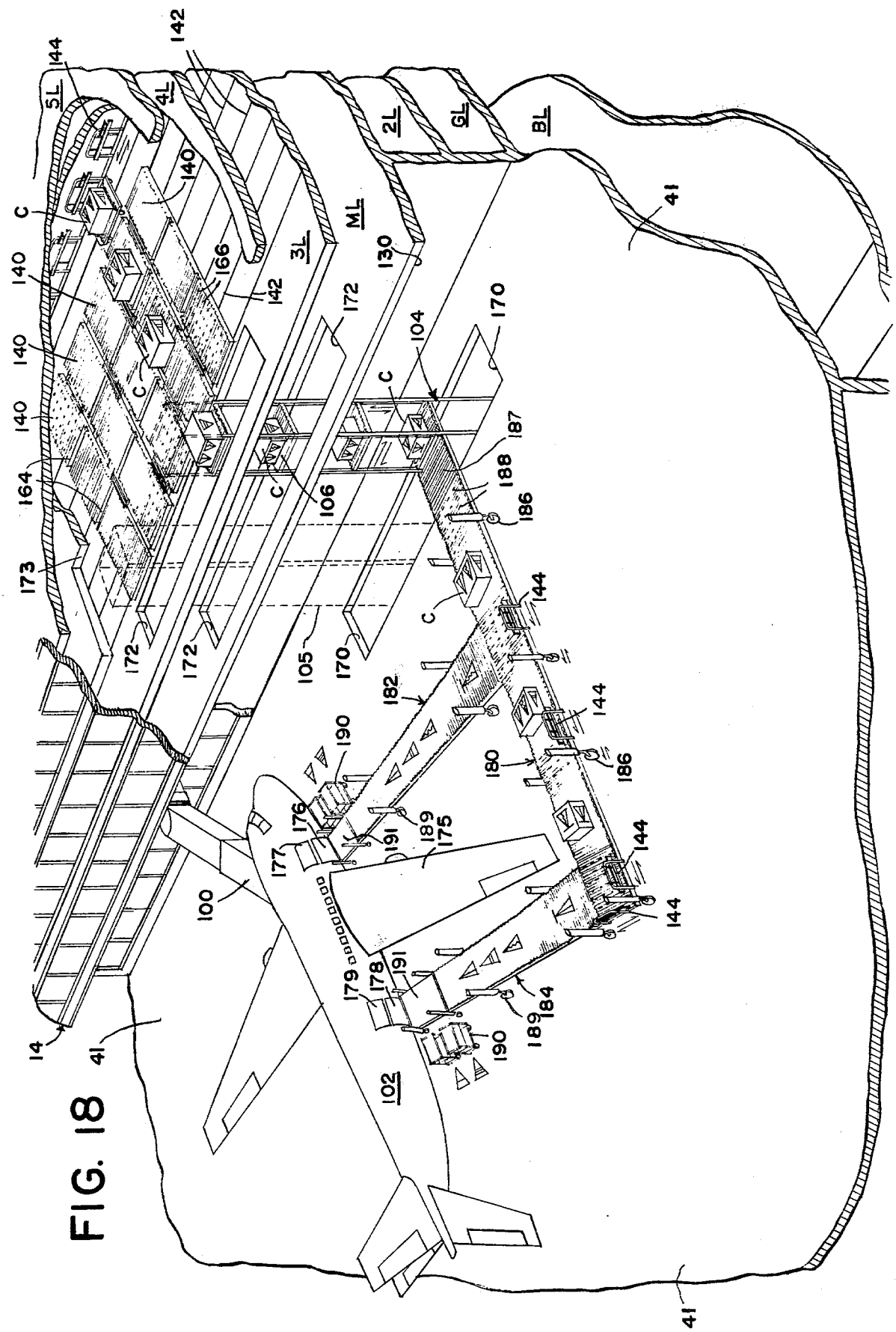

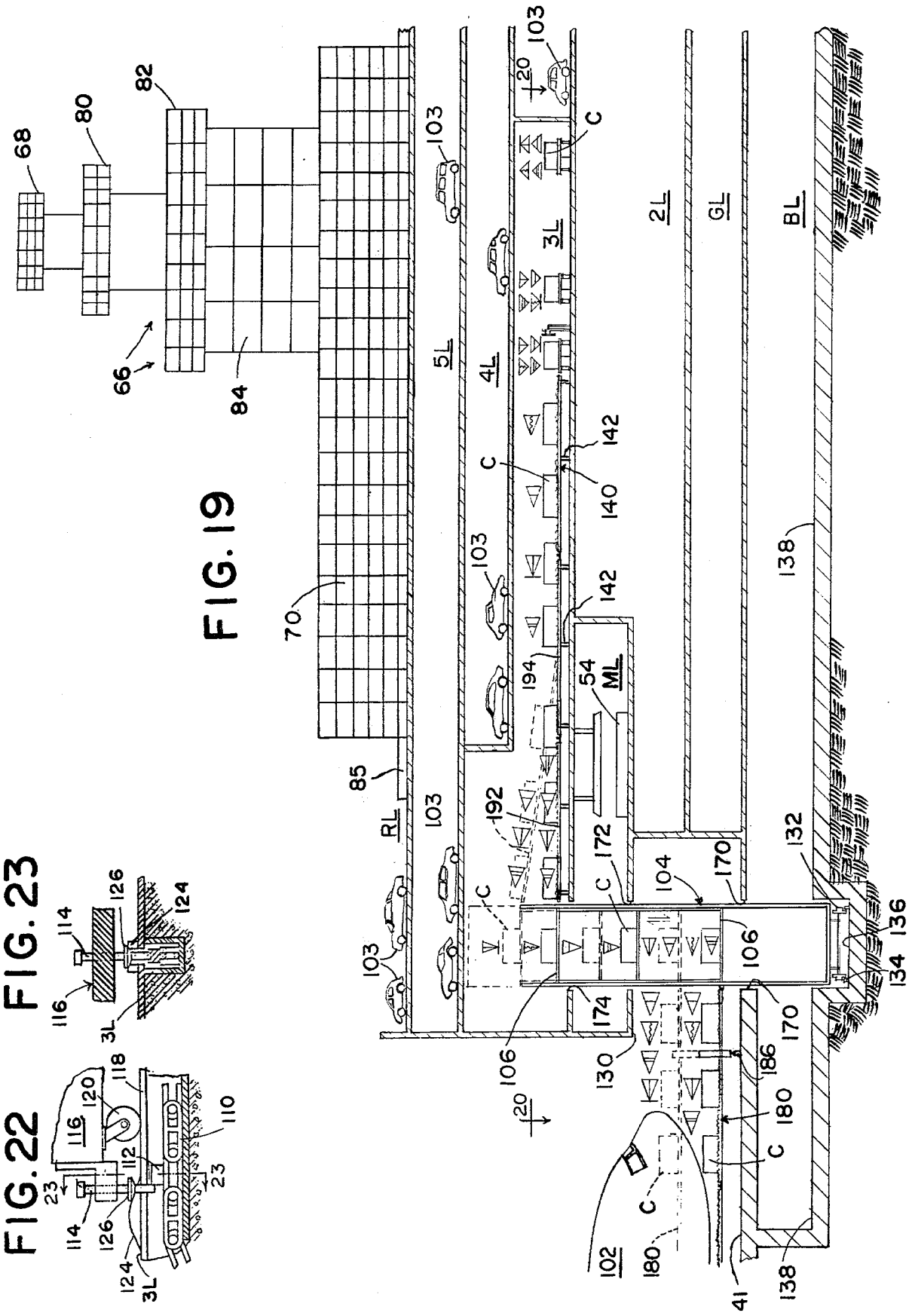

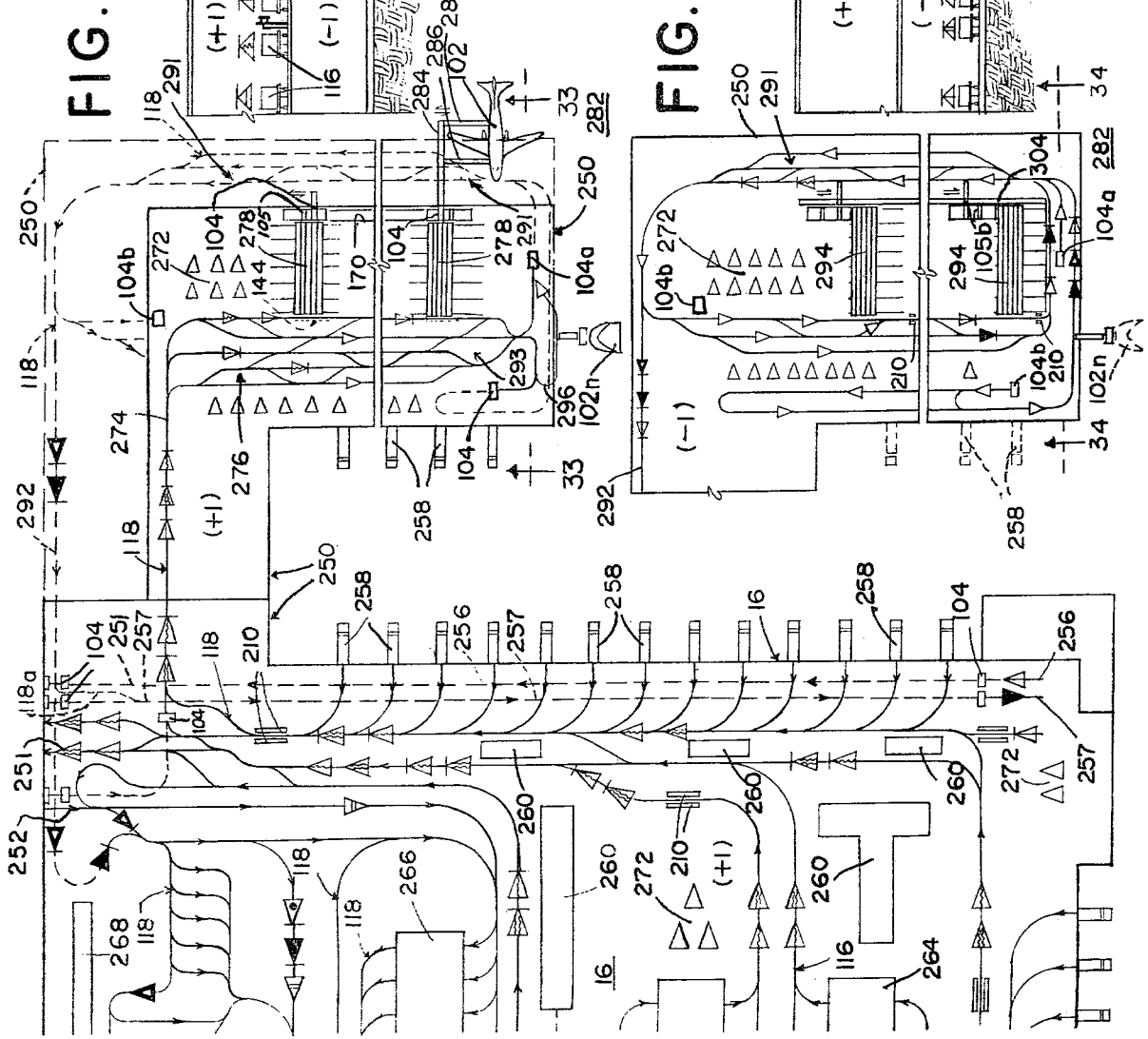

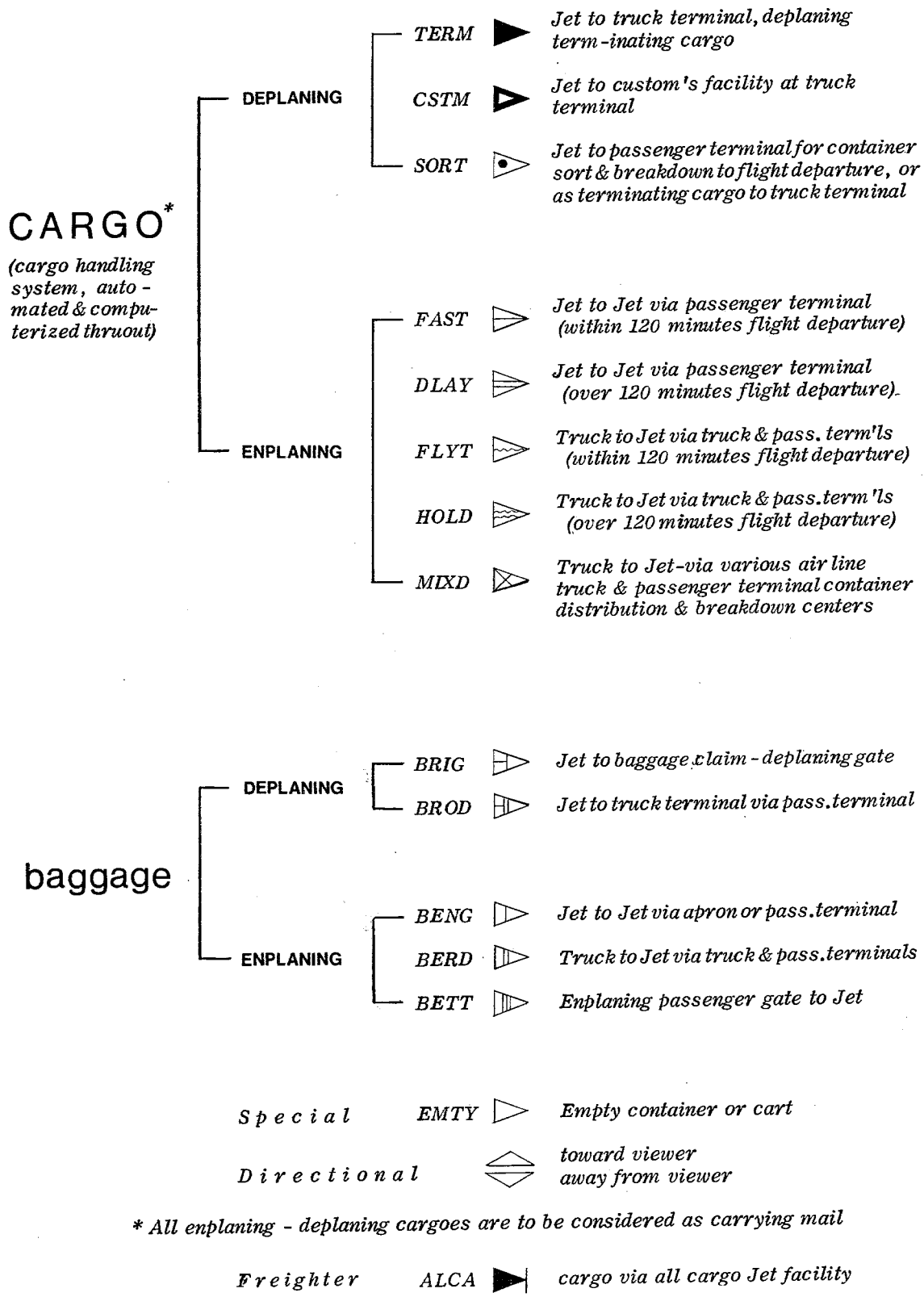
FIG. 35  Symbols showing movement of cargo & baggage thru airport

INDUSTRIAL AND URBAN AIRPORT COMPLEX WITH SPECIAL CARGO-HANDLING FACILITIES

The present invention relates generally to airports and has particular reference to an industrial and urban airport complex which is designed to serve an adjacent or nearby metropolitan city, together with its suburbs and environments. The invention is particularly concerned with an airport which makes provision for an increase in both passenger and cargo facilities as the population of the host city grows, thus giving rise to the need for additions to the size of the main or central passenger terminal, for the addition of cargo buildings, the rerouting of passenger traffic, cargo traffic, or both, together with the necessary modification of or addition to the computerized automated control system by means of which all added cargo facilities may be accommodated.

To a certain extent, the present airport bears some similarity to the airport which is shown and described in U.S. Pat. No. 3,916,588, granted to me on Nov. 4, 1975, and entitled "INTEGRATED INDUSTRIAL AND URBAN AIRPORT COMPLEX WITH PASSENGER AND FREIGHT HANDLING FACILITIES." However, this similarity is largely superficial inasmuch as the present airport complex possesses design and other accommodations that are not present in my earlier patented airport, one such design accommodation residing in a considerably closer or more compact positioning or grouping of the cargo receiving and dispatching buildings with respect to the passenger terminal so that the distances which are involved in transporting enplaning and deplaning cargo are materially reduced with a consequent saving of handling and movement time. Another and important advantageous feature of the present airport complex over my earlier airport resides in the use of a particular computerized directional in-floor towline system for transporting unit loads of cargo from one location to another along the same general level, and also in the use of a particular lift-type transport system for moving such unit cargo unit loads between vertically and laterally separated loading and unloading stations. By combining these two systems, the movement of both enplaning and deplaning cargo within the main passenger terminal between the various loading and unloading gates of the terminal, the cargo sorting areas, the cargo holding areas and other cargo handling areas is greatly facilitated.

Present-day major airports which serve adjacent host cities, such, for example, as New York, Chicago, San Francisco, Los Angeles, Cleveland, Denver, and numerous other cities having several million inhabitants are concerned primarily with the accommodation of arriving and departing jet aircraft but minor accommodations are usually provided for jet prop, ordinary propeller and other types of aircraft including helicopters, and occasionally dirigibles or other lighter than air craft. Thus, throughout this specification and for convenience of expression, the ground areas or aprons where enplaning or deplaning aircraft of any sort are mentioned will be referred to as jet maneuvering areas or aprons although such areas may occasionally accommodate the presence of a wide variety of other types of aircraft.

Due to the aforementioned similarity between the present airport complex and that of my U.S. Pat. No. 3,916,588, the disclosure of this patent will be heavily relied upon to augment the description of the present airport complex and, therefore, in order to avoid needless detailed description of a repetitious nature relating to passenger accommodations for baggage checking purposes, baggage retrieving or claiming functions, passenger walkways, escalators and other routing facilities, the location of ticket assignment desks, stariways, one-way turnstiles lavatories, customs and taxicab facilities, car rental offices, automobile storage or parking areas, as well as other facilities which are designed for passenger convenience will not be set forth in detail herein. Instead, the entire disclosure of such patent is hereby incorporated in and made a part of the present patent application insofar as it is consistent with the present disclosure. In short, the novelty of the present invention resides largely in the use of an improved cargo handling system which, as aforesaid, greatly relieves cargo congestion and delay in the movement of cargo, shortens the distance which such cargo is obliged to travel in and about the airport complex, and above all, effects a considerable saving in the time and manpower which are consumed in cargo handling.

In a further effort to avoid a needlessly long discussion of the movement of various cargo units from one destination to another within the airport complex, either for enplaning or deplaning purposes, a number of symbols have been devised and placed upon certain views of the drawings, such symbols disclosing at a glance the origination of a particular cargo unit and its destination within the airport complex. Other directional symbols in the form of triangular arrowheads have also been devised and utilized in the drawings. All such symbols have been clearly explained or defined in tabular form, the definition table being included as a part of the specification at an appropriate time.

Finally, whereas in my aforementioned patent substantially complete floor plans for each level of the main terminal building have been illustrated and described, many of these complete floor plans have been omitted herein or modified only according to the novel features of the present invention.

The provision of an airport complex such as has briefly been outlined above, and possessing the stated advantages, constitutes the principal object of the present invention. Numerous other objects and advantages of the invention, not at this time set forth, will become more readily apparent as the nature of the invention is better understood from a consideration of the following detailed description.

The invention consists in the several novel features which are hereinafter described and are more particularly defined by the claims at the conclusion hereof.

In the accompanying twenty-one sheets of drawings forming a part of this specification, several illustrative embodiments of the invention are shown.

In these drawings:

FIG. 3 is an enlarged plan view of the central portion of the airport complex, that is, the portion which embodies the main airport passenger terminal, the view being somewhat schematic in its representation and showing a passenger terminal which is equipped with approximately one hundred gates;

FIG. 4 is a side elevational view of the passenger terminal of FIG. 3;

FIG. 13 is a front perspective view of the twenty-gate starter passenger terminal unit which is shown in FIG. 9, the purpose being to illustrate the nature of a certain dual level ramp arrangement which is employed in connection with the invention;

FIG. 14 is a front elevational view of the structure of FIG. 13;

FIG. 15 is a schematic view illustrating certain deplaning cargo routes and handling equipment that are employed in connection with transporting enplaning cargo to a jet aircraft via the passenger terminal from various locations in the truck cargo building;

FIG. 16 is a schematic view similar to FIG. 15 but illustrating certain enplaning cargo routes and handling equipment that are employed in connection with the transportation of deplaning cargo from a jet aircraft into the cargo-handling system by means of which such cargo may be dispatched elsewhere;

FIG. 17 is a surface layout similar to FIG. 1 but showing the twenty-gate starter passenger terminal unit and its associated commercial cargo and air freight buildings;

Figure 9:
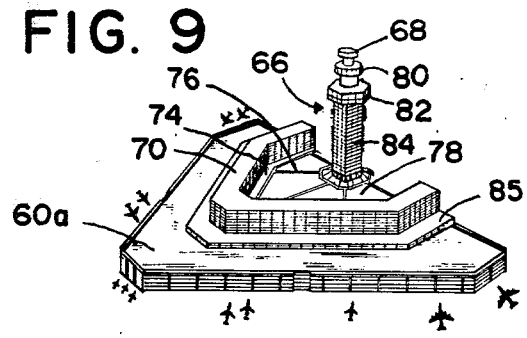
FIG. 9 is a perspective view of the completed twenty-gate starter passenger terminal unit which is schematically shown in FIG. 5.
Figure 18A:
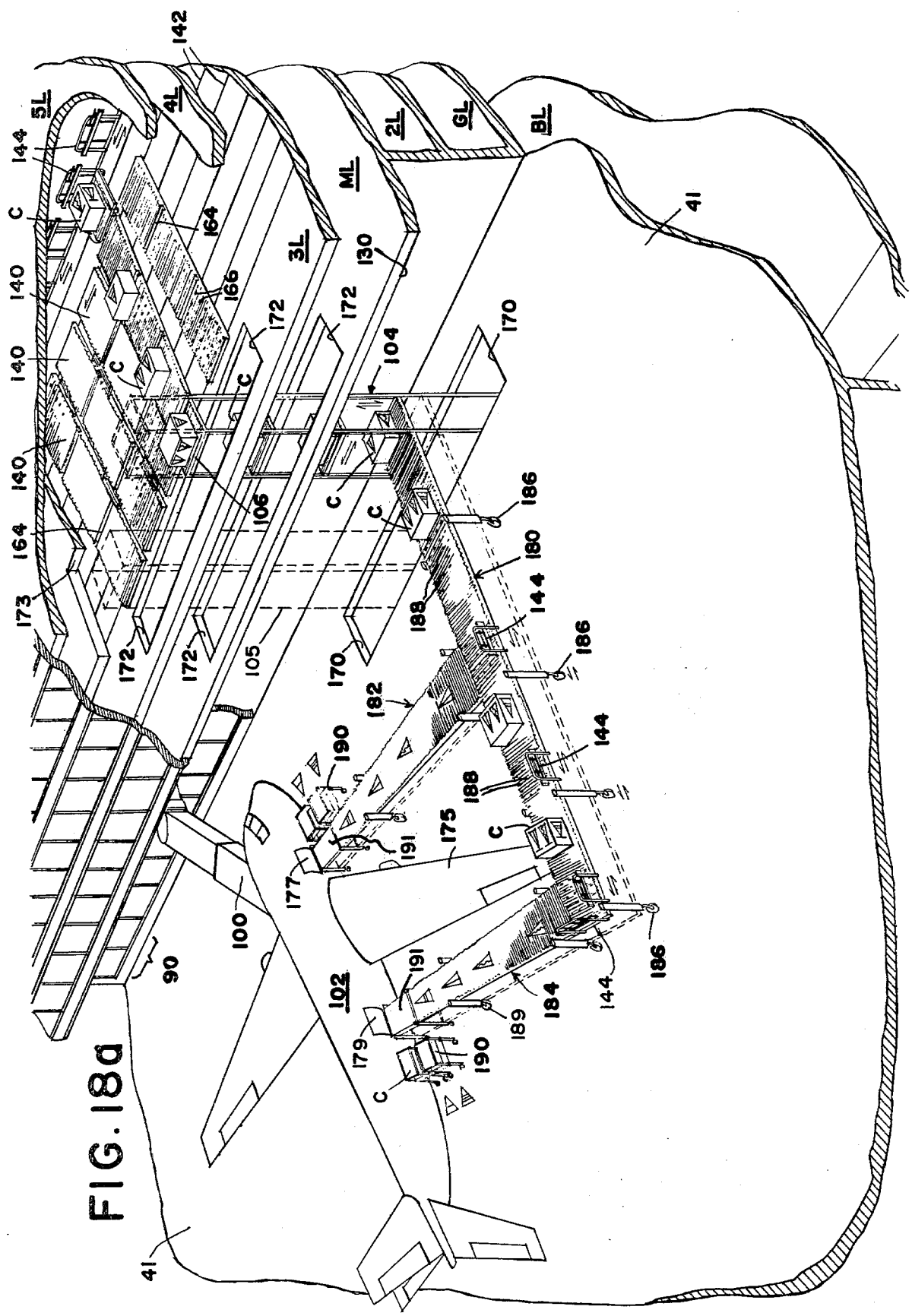
Figure 20:
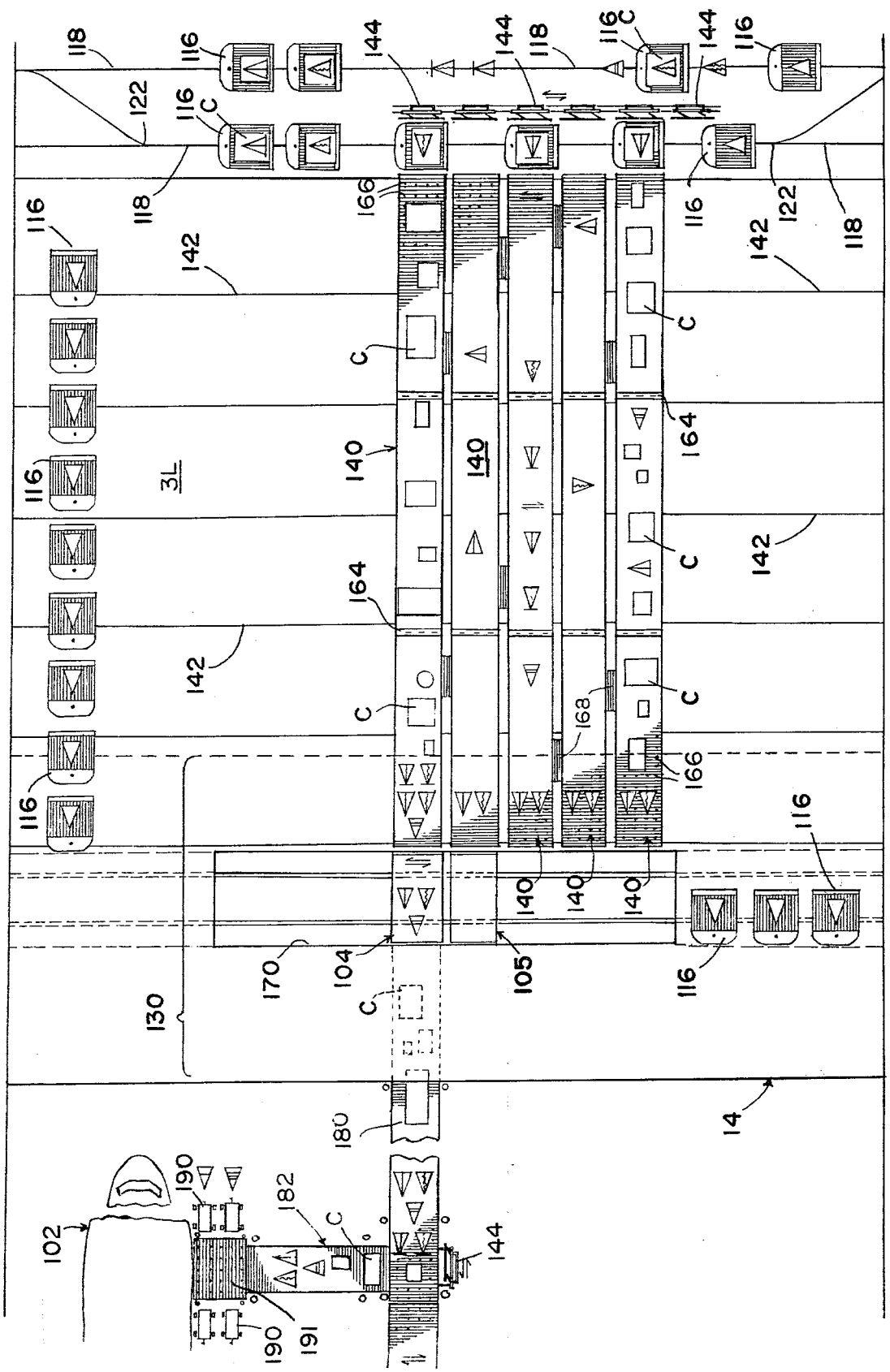
Figure 21:
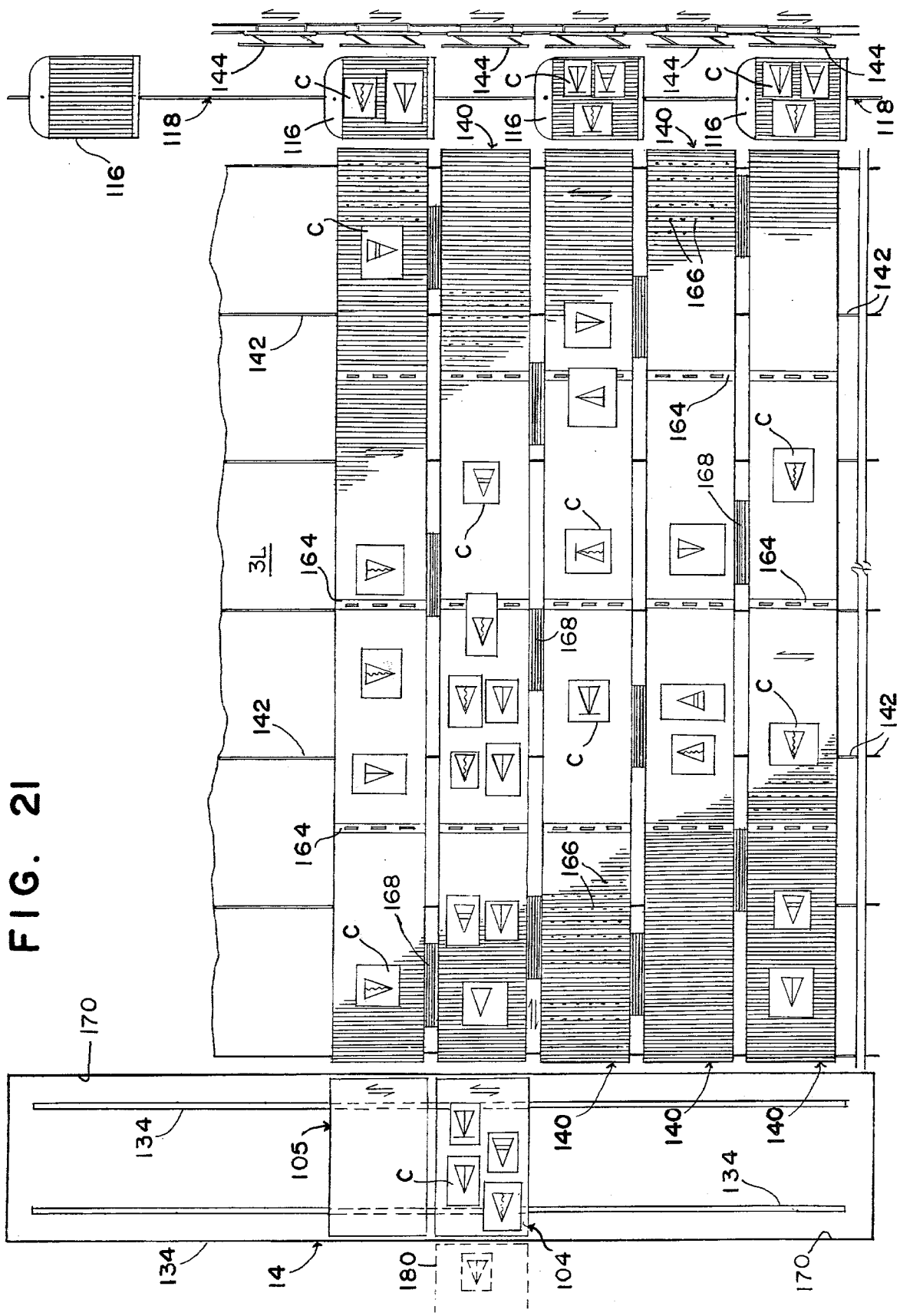
Figure 24:
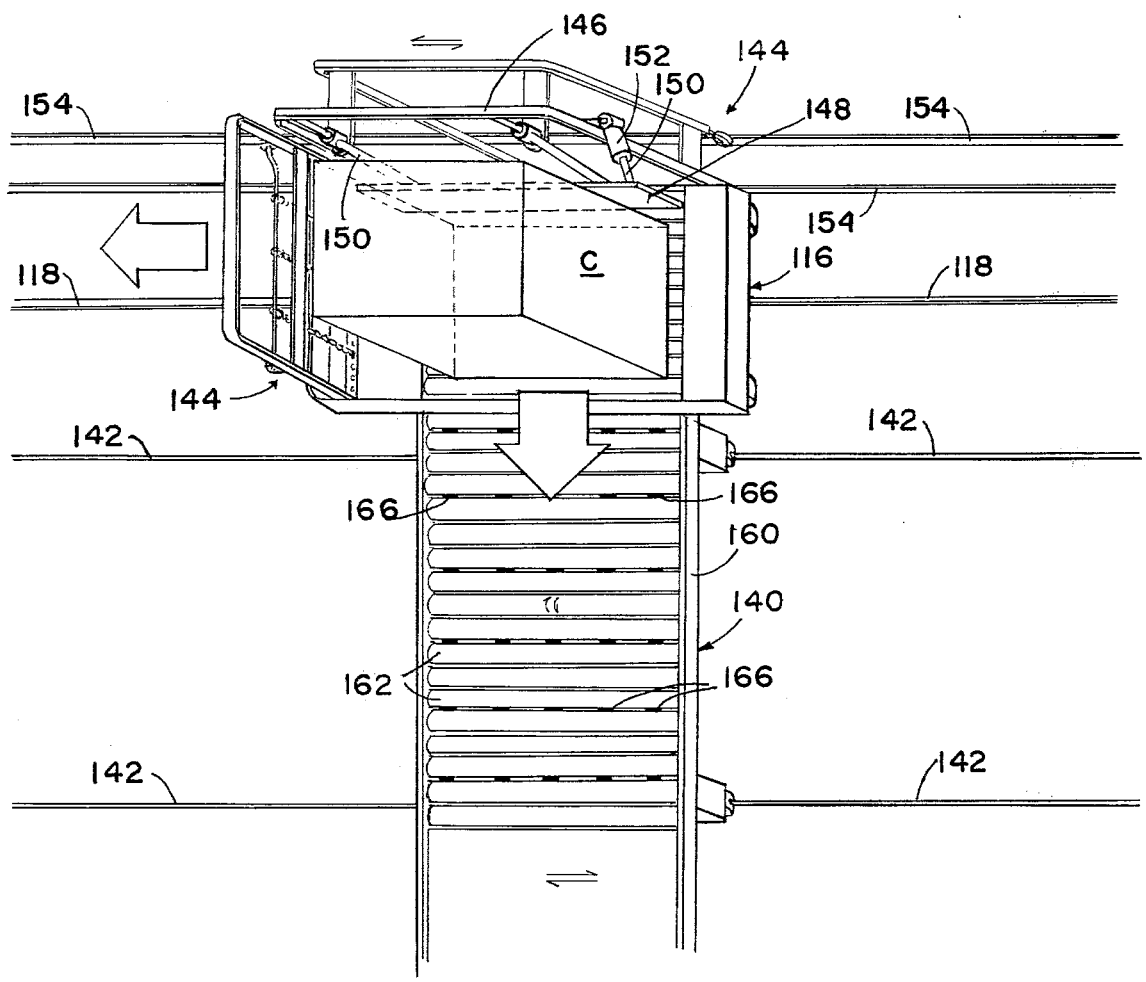
Figure 25:
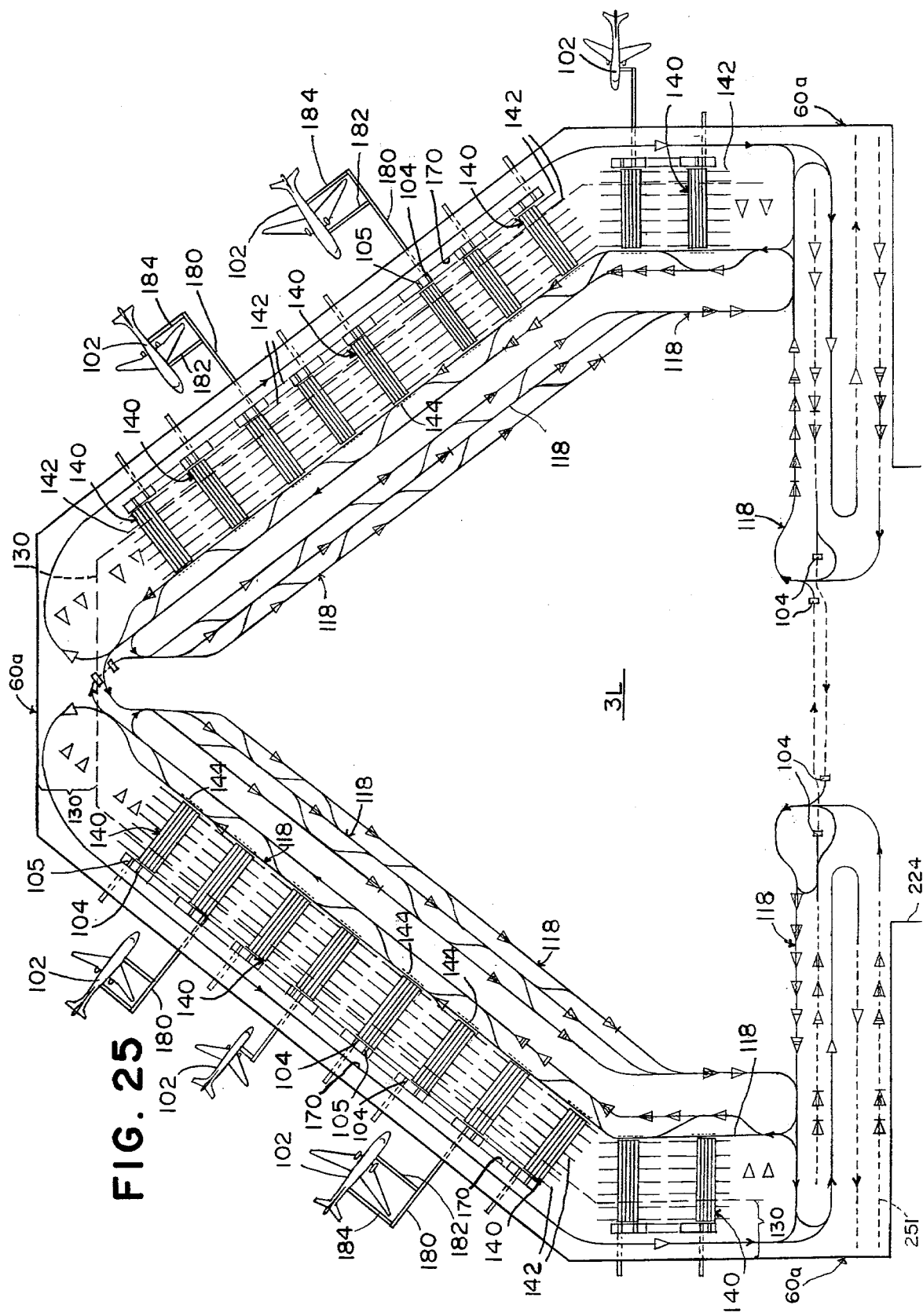
Figure 26:
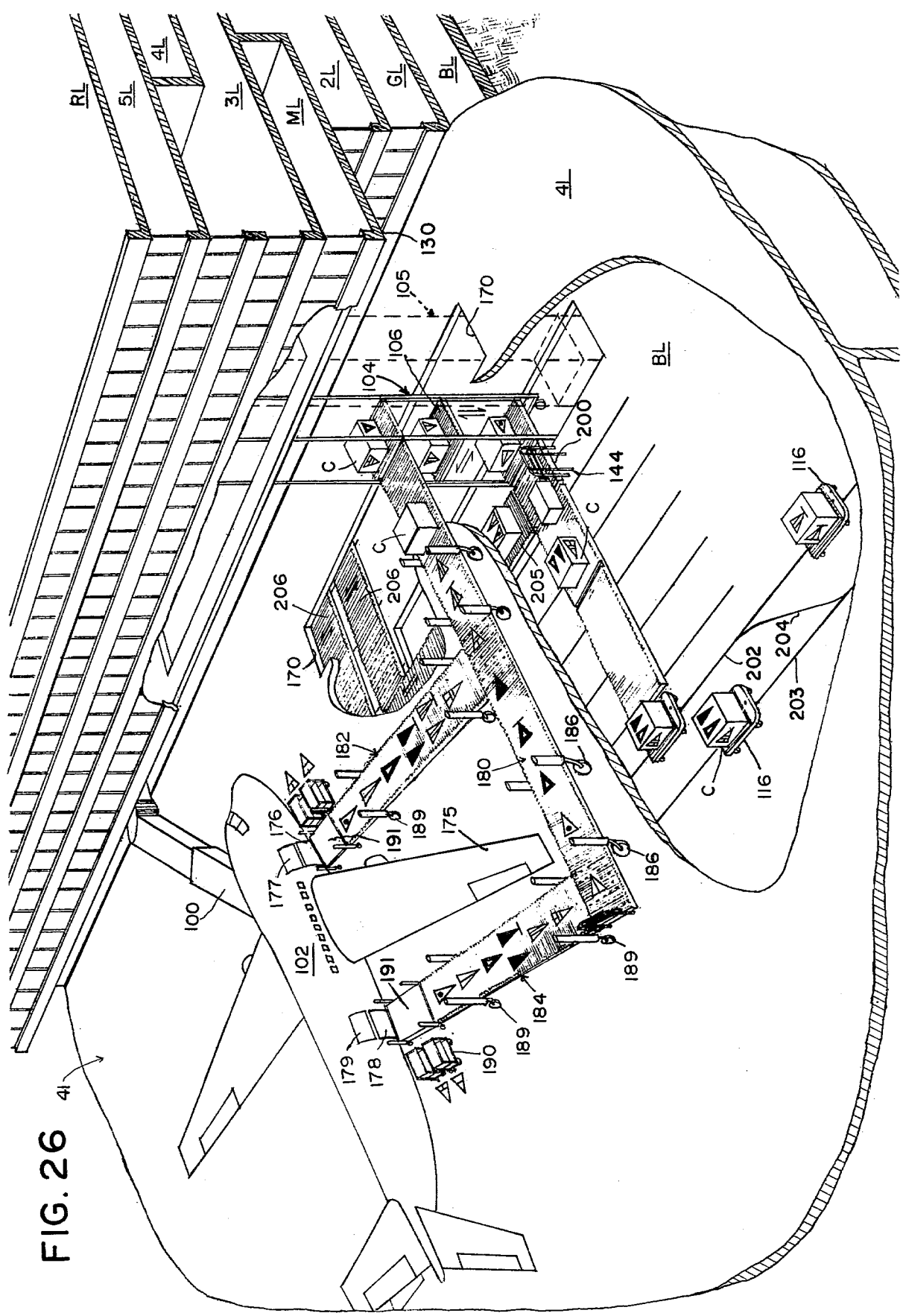
Figure 27:
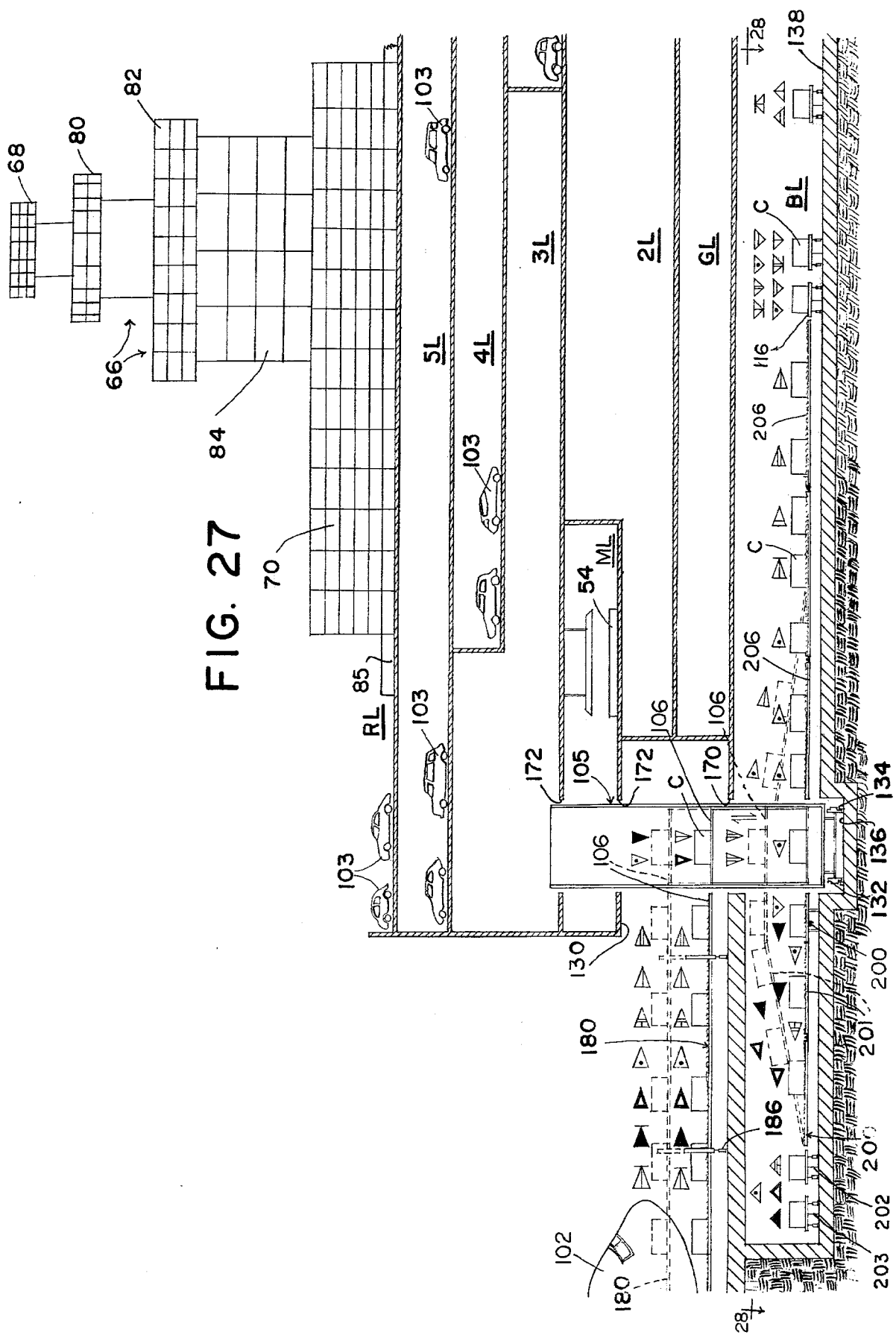
Figure 28:
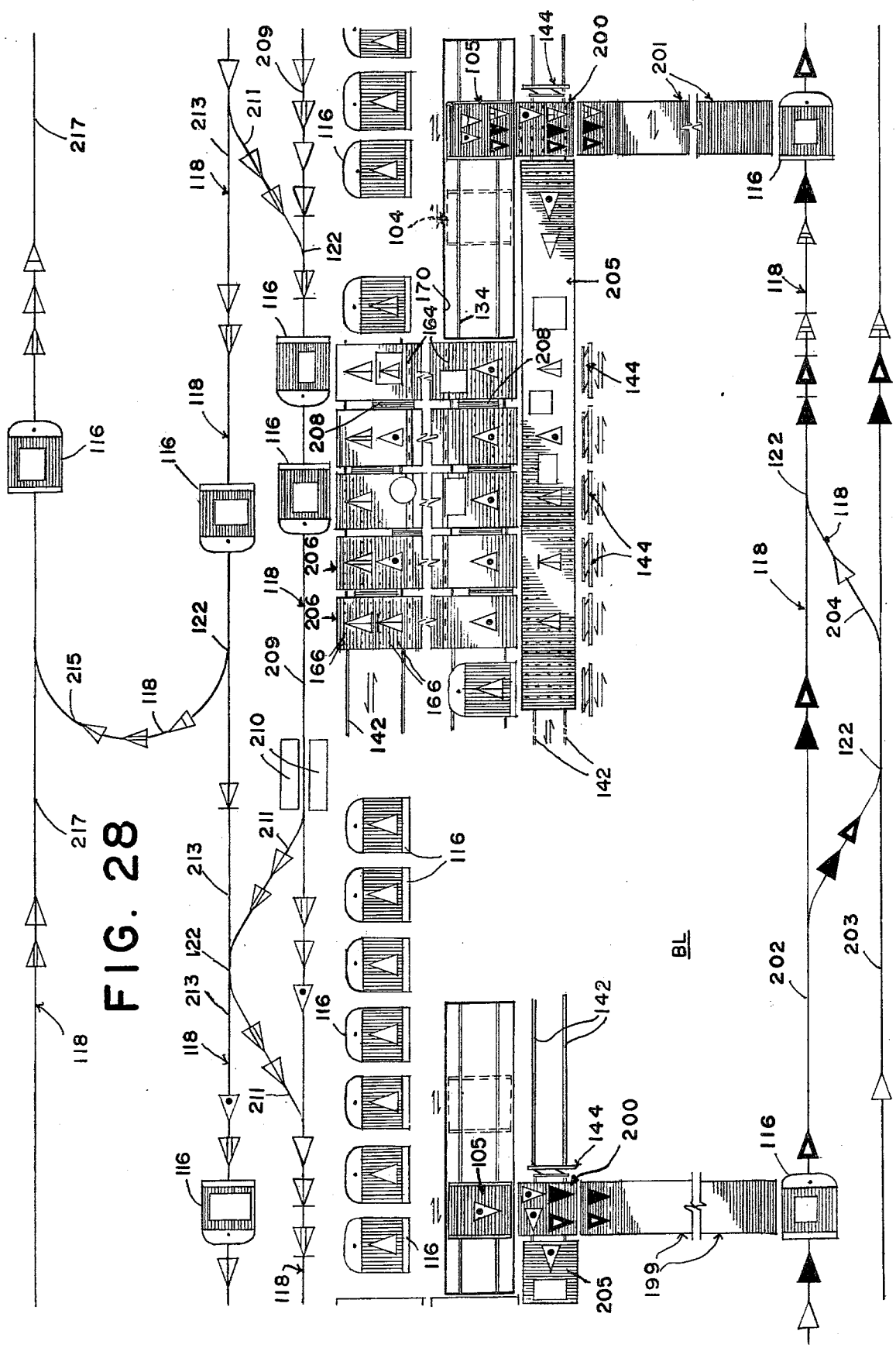
Figure 28A:
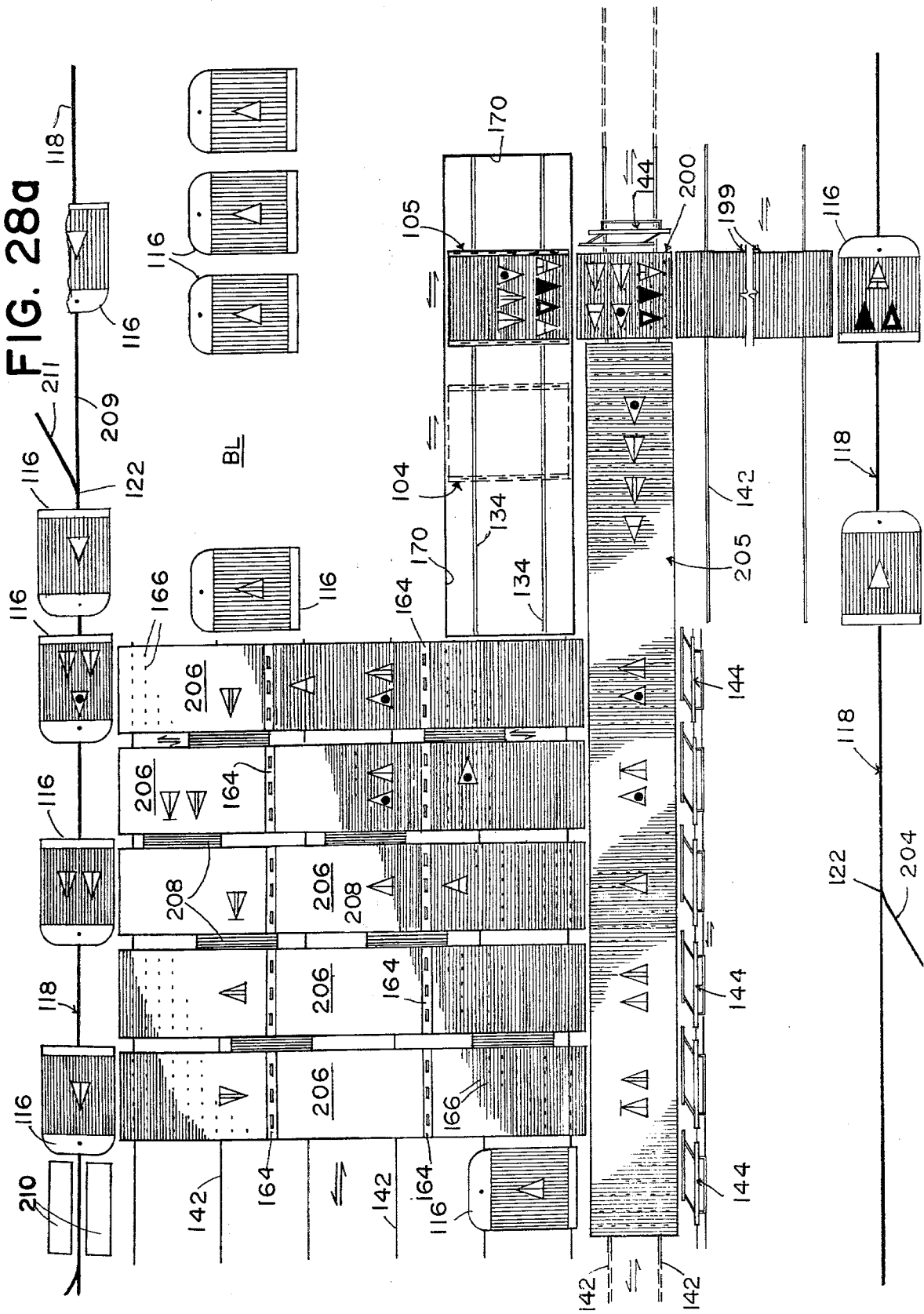
Figure 29:
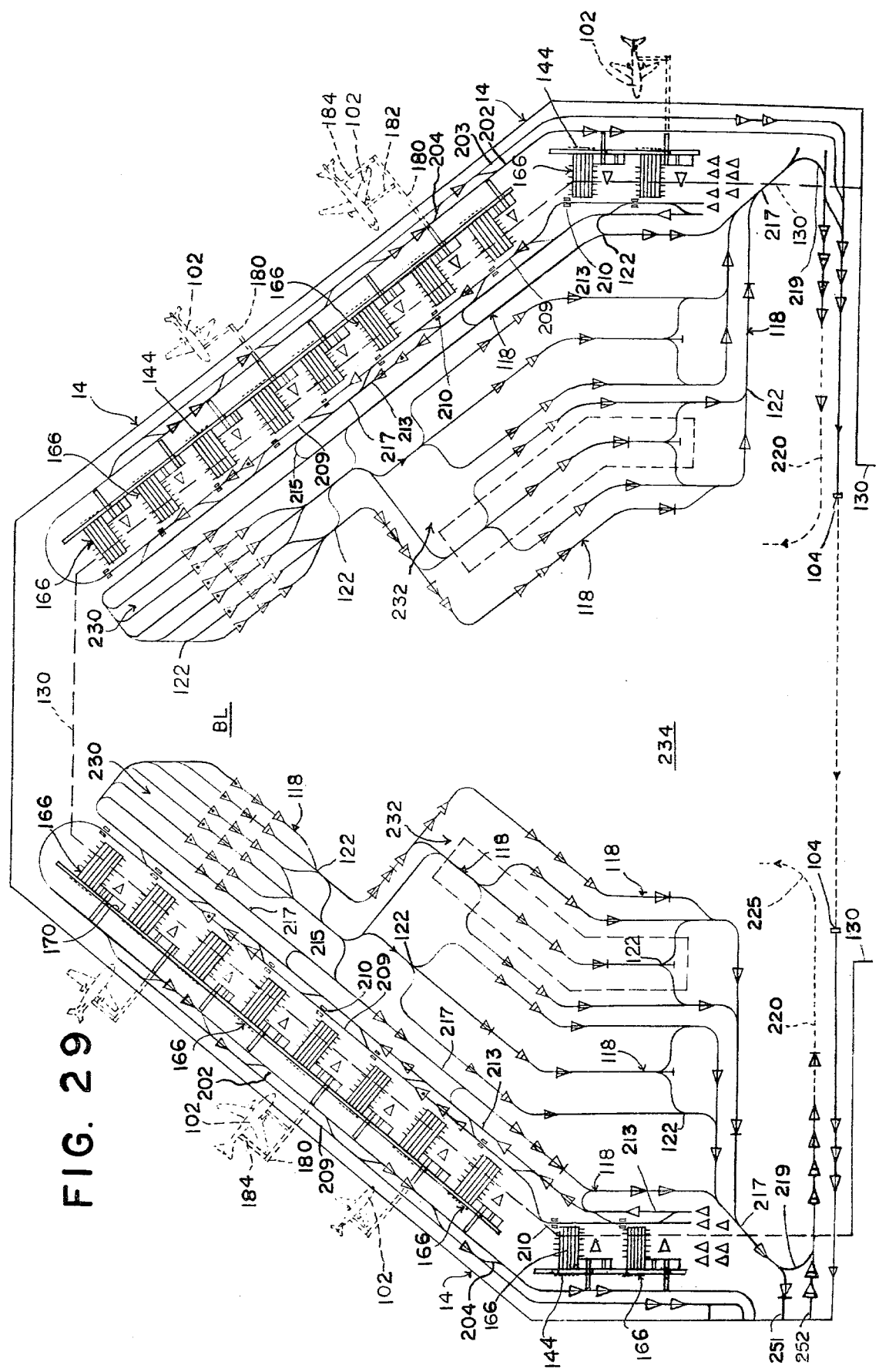
Figure 30:
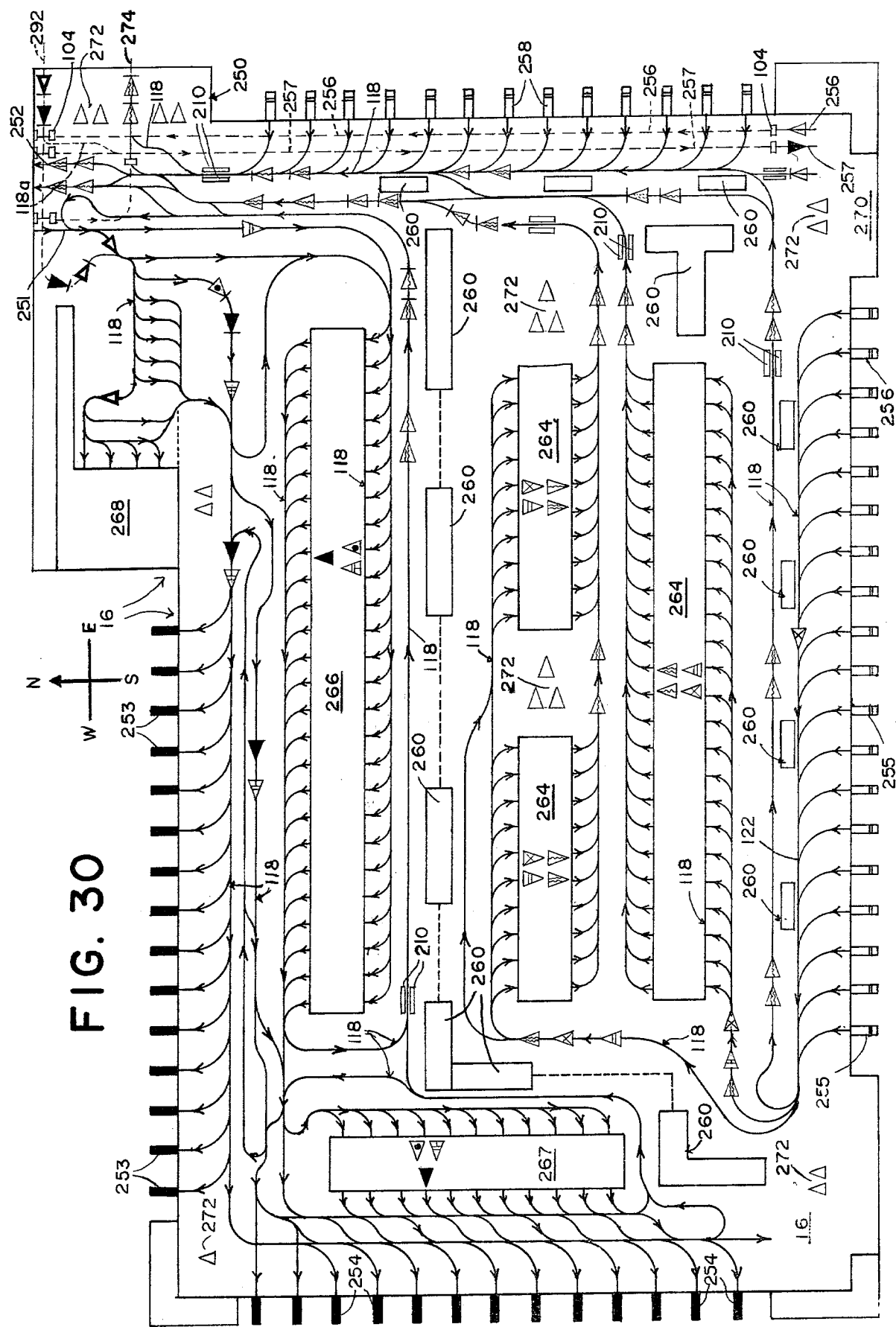

FIG. 18 is a fragmentary, perspective view, somewhat schematic in its representation, showing the facilities for transferring enplaning cargo from the third floor level of the main passenger terminal to ground level in order that said enplaning cargo may be loaded into a stationary jet aircraft through its lower cargo door, utilizing a certain novel association of both horizontal in-floor towline, power roller, vertical cargo-lowering transport mechanism, and ground level conveyor means;

FIG. 18a is a perspective view similar to FIG. 18 but showing the transferring facilities arranged so as to load the enplaning cargo into the aircraft through its upper cargo door;

FIG. 19 is an enlarged, fragmentary, sectional view taken on the line 19—19 of FIG. 3 and illustrating in particular certain enplaning cargo transporting operations that take place on the third floor level of the main passenger terminal whereby unit cargo loads are conducted by power roller facilities to cargo-lowering mechanism which brings the loads to ground level for subsequent conduction to a parked jet aircraft on the jet apron which surrounds the passenger terminal;

FIG. 20 is a third floor level passenger terminal layout illustrating the enplaning cargo-handling facilities of FIG. 19, such view being largely schematic and taken on the line 20—20 of FIG. 19;

FIG. 21 is an enlarged fragmentary detail view of a portion of the structure shown in FIG. 20;

FIG. 22 is a fragmentary detail sectional view taken vertically through the third floor level of the passenger terminal in the immediate vicinity of one of the towlines which are employed for enplaning cargo motivating purposes, the view illustrating the relationship between the tow pin of a cargo cart and the motivating tow chain of the cargo-handling system;

FIG. 23 is a vertical sectional view taken on the line 23—23 of FIG. 22;

FIG. 24 is a fragmentary, front, perspective view of one of a series of laterally shiftable "clean sweep" mechanisms which are employed in connection with the invention for shifting containerized enplaning cargo units onto various power rollers which likewise are laterally shiftable;

FIG. 25 is a third floor passenger terminal level enplaning cargo diagram for the twenty-gate starter passenger terminal unit of FIG. 9;

FIG. 26 is a fragmentary perspective view similar to FIGS. 18 and 18a, the view showing a portion of the jet apron which surrounds the passenger terminal, also a jet aircraft in position thereat and connected to one of the passenger gates by an appropriate passenger bridge, and also showing the manner in which deplaning cargo is conducted by power conveyor rollers to an elevator-type mechanism whereby cargo is lowered to a below grade level of the passenger terminal;

FIG. 27 is a fragmentary, sectional view similar to FIG. 19, showing certain deplaning cargo transporting operations that take place on the jet apron of the passenger terminal whereby unit cargo loads are conducted by power roller facilities to cargo-lowering mechanism which brings them to below grade level of the passenger terminal where they are selectively dispatched as enplaning cargo to the cargo-handling system of the passenger terminal or as deplaning terminating cargo to the cargo building of the airport complex;

FIG. 28 is a fragmentary, basement level layout or plan view taken in the direction of the arrows which are associated with the line 28—28 of FIG. 27, and illustrating in schematic fashion the handling of cargo units through various holding and/or distributing areas for either deplaning or enplaning purposes;

FIG. 28a is an enlargement of a fragmentary portion of the structure shown in FIG. 28;

FIG. 29 is a basement, passenger terminal level, cargo deplaning and/or enplaning diagram, similar to FIG. 25, for the twenty-gate starter passenger terminal unit of FIG. 9;

FIG. 30 is an enlarged, fragmentary, ground level layout or floor plan view of the main portion of a cargo building which is associated with the present airport complex;

FIG. 31 is a floor plan adjunct to FIG. 30 completing the ground level floor plan of the cargo building and showing in particular the nature of a cargo facility building offset which is used exclusively for "cargo only" type jet aircraft enplaning-deplaning operations independent, but interconnected with, those which taken place at the passenger terminal of the airport complex and also the cargo building itself;

FIG. 32 is a basement level layout or floor plan view of the cargo facility building offset of FIG. 31, such view depicting the nature of certain cargo enplaning-deplaning operations which take place independently of the passenger terminal;

FIG. 33 is a vertical sectional view taken on the line 33—33 of FIG. 31;

FIG. 34 is a vertical sectional view taken on the line 34—34 of FIG. 32; and

FIG. 35 is an explanatory chart defining insofar as is practical certain identifying, directional and other enplaning-deplaning cargo symbols which are distributed throughout many of the views of the drawings, such chart augmenting certain introductory descriptive material which appears in the following detailed description or specification.

Figure 1:
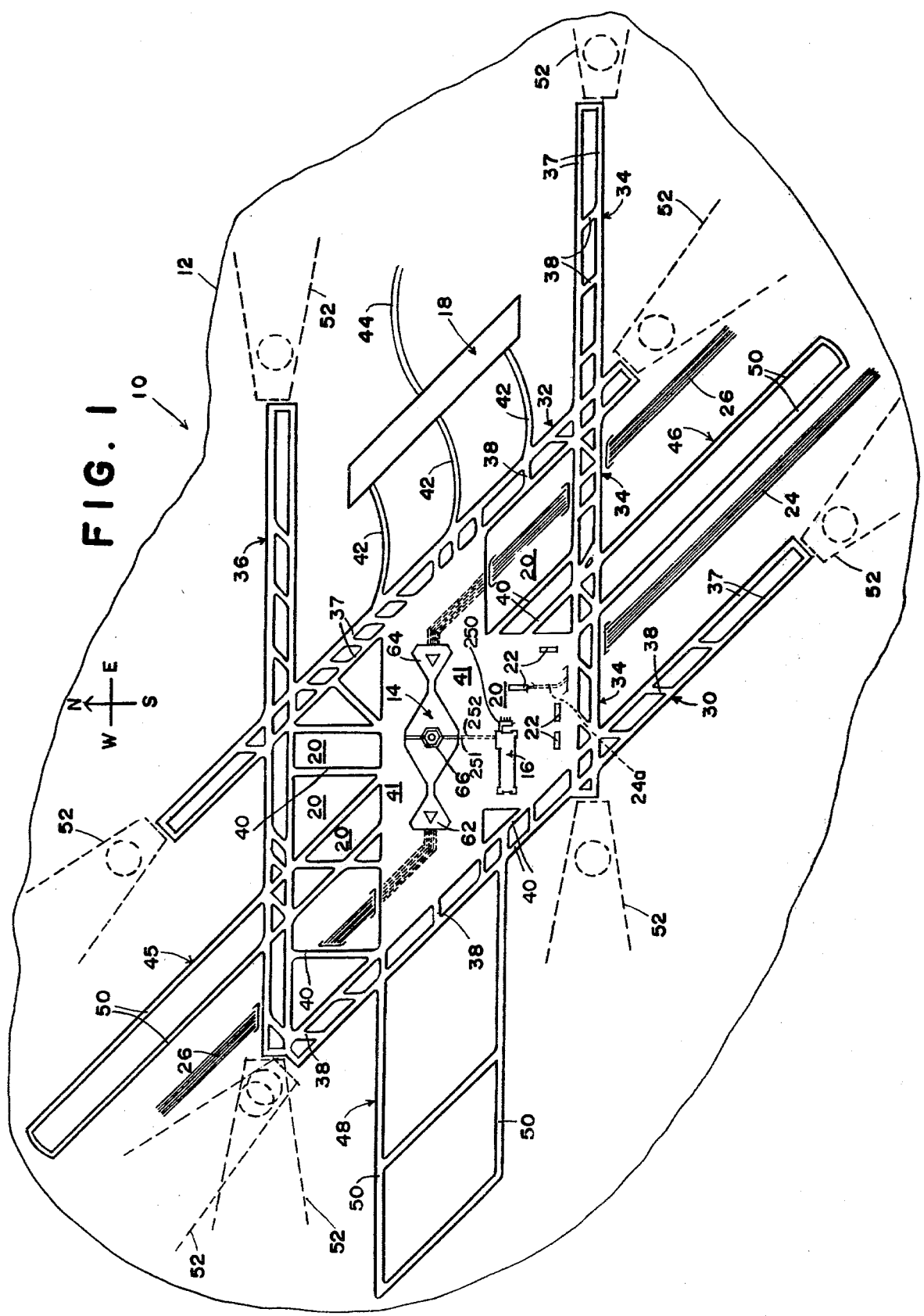
FIG. 1 is a surface layout of a composite major airport installation or complex embodying the principles of the present invention and showing the installation as being constructed to accommodate a passenger terminal having a total or full complement of one hundred or so gate capacity, together with adjacent cargo buildings.

Referring now to the drawings in detail and in particular to FIG. 1, there is disclosed in this view or figure. a major airport installation or complex 10 which is located on a tract of land as shown in outline by the wavy line 12. The dimensions of the land tract may vary within wide limits but for purposes of orientation and of relative size comparisons between the various runways, buildings and other component parts of the installation or complex 10, the length of the tract is stated to be on the order of six miles which might well accommodate a city of several million inhabitants such as New York, Chicago, Los Angeles, or any other major city in the United States. Although the illustration of FIG. 1 is based upon a six-mile span in order to emphasize runway, building, and other dimensions, it is to be distinctly understood that the actual dimensions which are employed may vary according to the service for which the airport is intended and according to the population size of the particular municipality which the airport is intended to serve. It is obvious that for municipalities smaller than those suggested above, appropriate modifications of the complex are contemplated, such modifications consisting largely of either building size reductions or component eliminations. As will become apparent presently when modified forms of the airport complex are illustrated in other views of the drawings, the major size airport illustration of FIG. 1 is susceptible to preplanned erection or construction, utilizing fewer components, for example, a smaller size main starter passenger terminal unit, such components, and particularly the main passenger terminal, being readily subject to enlargement in an orderly fashion so as to increase the number of passenger and cargo gates as required without disrupting already existing installations to any appreciable or undue extent.

It has been previously stated that the present airport complex is patterned after the airport complex which is shown and described in my U.S. Pat. No. 3,916,588 insofar as its surface layout is concerned, the principal differences residing in a more closely grouped or condensed arrangement of its various facilities as well as in the use of a novel automated computerized cargo-handling system involving not only a different routing of enplaning and deplaning cargo units, but also of a novel structural motivating mechanism for transporting the cargo units from one area to another area, station to station, or point to point as the case may be, all in a manner and for purposes that will be described in considerable detail subsequently.

As is the case in connection with my aforementioned patented airport complex, there are provided a plurality of buildings, a mass transit railway system for passengers and cargo coming to and leaving the complex, a series of packaged freight-transporting rails, vehicular roads or expressways, and a system of runways or airstrips, the surface layout of such buildings and systems being shown diagrammatically in FIG. 1 of the drawings.

Insofar as the airport buildings are concerned, these include a main centrally located passenger terminal 14, a nearby freight or cargo building 16 and a hangar building 18 including maintenance and repair shop facilities. Various grass or other plots 20 are appropriately distributed throughout the complex area, the particular plot on which the cargo building 16 is located being provided with a group of commerical air freight forwarding buildings 22.

Figure 2:
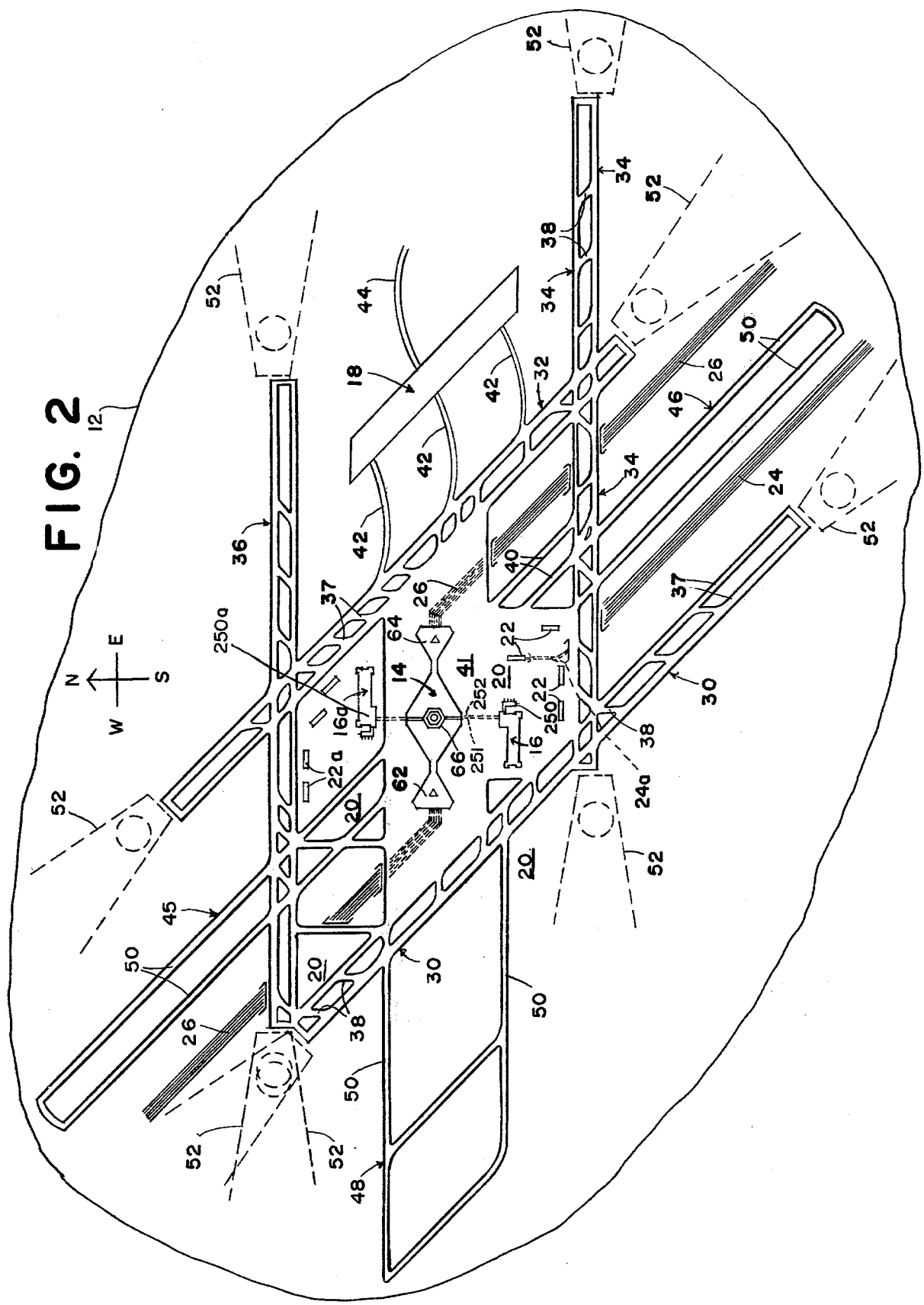
FIG. 2 is a modified surface layout wherein additional cargo buildings have been added to the layout of FIG. 1 in the immediate vicinity of the passenger terminal.

The cargo building 16 of the airport complex 10 is served by incoming and outgoing railroad tracks and roadways, such roadways being schematically shown by a series of parallel lines 24 due to small scale space limitations, the tracks being preferably centrally disposed between two roadways and designated by the reference numeral 24a. As shown in FIGS. 1, 2 and 17, such tracks lead into and out of the below ground level of one of the airfreight forwarding buildings 22. A similar arrangement 26 of railway tracks and roads enters the complex 10 at opposite ends thereof, the tracks and roads extending completely through the airport and passing longitudinally through the main passenger terminal 14, these tracks and roads being employed for both passenger and certain cargo or baggage accommodations. It is to be noted at this point that the cargo building 16 is employed largely for cargo sorting purposes where cargo having a high priority timewise is automated, computerized, and dispatched within a very short period of time, as, for example, where cargo which must be enplaned within two hours is dispatched in ample time for such enplaning, taking into consideration the distance which is involved in getting it to the assigned cargo jet aircraft, and where cargo which has no such priority may be held for subsequent automated and computerized dispatch at a convenient time. The nature of the sorting and dispatching operations which take place within the cargo building 16 is disclosed in considerable detail in FIGS. 30 and 31, to which specific reference will be made hereafter.

Still referring to FIG. 1 of the drawings, sorted cargo which is destined for subsequent enplaning purposes at the various gates of the passenger terminal 14 is transported underground by a towline arrangement which is embodied in an over-all towline system which is used in connection with the main passenger terminal 14, and particularly with the third floor level of such terminal as will be explained in detail presently.

The aircraft runway system of the airport complex 10 is similar to that which is disclosed in my aforementioned U.S. Pat. No. 3,916,588. Such system per se constitutes no part of the present invention, but its disposition with respect to the railway and highway systems, together with the provision of certain taxiways affords novel and useful aspects of the airport complex as a whole, all as will be pointed out hereinafter. The runway system preserves the intersecting arrangement of runways which is shown in such aforementioned patent, the four runways being respectively designated by the reference numerals 30, 32, 34 and 36. Each aircraft runway is of a dual nature and embodies relatively wide taxiways 37 of adequate width to meet the requirements of the largest aircraft to be accommodated, and also relatively narrow tunoffs 38 which connect the taxiway at appropriate locations. A network of turnoffs 40 leads inwardly from the four runways 30, 32, 34, and 36, and communicates with a concrete, aircraft, ramp area or apron 41 which surrounds the main passenger terminal 14. Additional aircraft turnoffs 42 lead from the outer taxiway 37 of the runway 32 to the hangar building 18 while a road 44 communicates with the outer side of such hangar building. In order to facilitate further reference to the runway system, as well as to other areas of the land tract 12 which is encompassed by the lane, a weather vane-type directional indicia appears in the layout of FIG. 1. Such indicia are, however, only exemplary and it will be understood that the orientation of the aircraft runway system will be determined by such factors as the geographical location of the airport complex 10 and the prevailing winds at such location. The various runways 30, 32, 34, and 36 are useable either as arrival or departure runways, but preferably, and in accordance with the runway system of my U.S. Pat. No. 3,916,588, all of these runways are used as arrival runways while aircraft departures are effected by using a series of three outwardly extending runways 45, 46 and 48, each of which comprises a pair of spaced apart taxiways 50. Illuminated approach cone patterns 52 may be provided at the outer ends of the various landing runways 30, 32, 34 and 36. It will also be understood that various standardized runway and taxiway lighting systems and runway surface markings (not shown) may be provided. For a more complete understanding of the advantages of the arrangement of the various runways 30, 32, 34 and 36 which are employed in the present airport complex 10, reference may be had to U.S. Pat. No. 3,558,085, granted to me on Jan. 26, 1971 and entitled "AIRPORT SURFACE LAYOUT," it being deemed sufficient to point out that the arrangement affords what may be termed a "flow through" aircraft arrival system wherein a unidirectional flow of arriving and departing aircraft is attained.

Still referring to FIG. 1 of the drawings, and additionally to FIGS. 5 to 12, inclusive, wherein the main passenger terminal 14, insofar as its shape characteristics are concerned, is clearly illustrated, this terminal together with its various passenger and freight loading gates and the facilities which its offers for mass passenger and cargo movements, as well as for passenger conveniences, possesses a building outline or exterior substantially identical to the main passenger terminal which is shown and described in my U.S. Pat. No. 3,916,588 and, except for a central tower structure which is associated therewith, it contains seven building levels including a basement or below grade level and a roof level. The various building levels have been labeled in FIGS. 19 and 26, from bottom to top, as BL, GL, 2L, 3L, 4L, 5L and RL, the BL level being the basement and the RL level being the roof of the main passenger terminal 14. A mezzanine level ML of balcony-like design is provided on the second floor level 2L and may be considered as a part of the second floor level. This mezzanine level is designed as a flight kitchen having the usual kitchen equipment such as stoves 54, refrigerators, and food storage compartments, together with food preparation tables, dishwashing equipment, food-handling machinery and kitchen office equipment. The activities which take place on the first, second, fourth, fifth and sixth floor levels of the present passenger terminal 14 remain substantially the same as those on the corresponding floor levels of my patented airport complex and, for an understanding thereof, reference may be had to U.S. Pat. No. 3,916,588 which, as earlier stated, has been incorporated in and made a part of the present application. The present invention, as previously pointed out, is concerned largely with certain automated and computerized carghandling operations which take place on the third floor level 3L and the basement level BL, as well as with lift-type mechanism by means of which the cargo may be lowered from such third floor level to the ground level and from ground level to the basement level.

Still considering the character of the main passenger terminal 14, such terminal is so designed that it may be erected over a period of time to accommodate the addition of combination passenger and cargo gates, terminating in a full gate complement of one hundred gates as shown in FIGS. 1, 3, 8 and 12 of the drawings. When equipped with its full gate complement, the terminal 14 is provided with a central section 60 which approximates that of a parallelogram, together with a pair of wing sections 62 and 64, each of which has an outline which approximates that of a triangle. More accurately, the central section 60 is, roughly speaking, diamond-shaped, while the wing sections 62 and 64 are generally triangular with truncated outer corners. Considering the three sections as a whole, a plan view thereof presents an outline which is generally in the shape of a "bow tie." A terminal of this shape presents numerous functional and structural advantages. Among the functional advantages are the inhibition of air pollution in the vicinity of the main terminal due to the absence of predominant building projections and pocket-like depressions which ordinarily capture and retain gaseous emissions from aircraft, the avoidance of passenger congestion within the interior so that right-angle corners within the terminal do not conceal passenger destinations, and improved maneuverability of aircraft on the loading ramp area or apron 41 where wide-angle access to the various loading gates is available. Equally important are the structural advantages which enable the terminal to be erected in a preplanned addition from the construction of a "starter unit" of relatively small dimensions as shown in FIGS. 5 and 9, progressively up to the full gate complement of FIGS. 1, 8 and 12.

Figure 12:
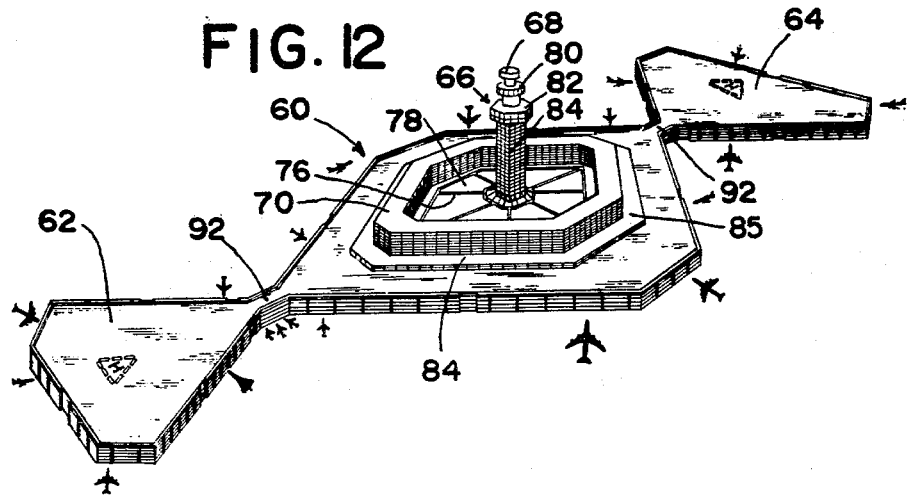
FIG. 12 is a perspective view of the full one hundred gate passenger terminal unit which is schematically shown in FIG. 8.

Before considering such progressive erection of the main passenger terminal 14, it is here pointed out that in any stage of development, the terminal further includes a central tower structure 66 which may constitute an administration and public office rental building section and the extreme upper end of which may be used as a gate control tower 68 where computerized equipment and a computer staff may attend to gate assignments of passenger and cargo for incoming and outgoing aircraft in the usual manner of such gate control operations. In the completed full gate complement terminal 14, although the specific architectural features of this central tower structure 66 have not been disclosed herein, a general octagonal inhabitable building complex 70 surrounds the tower structure 66 as best shown in FIG. 12 of the drawings and extends upwardly from the seventh floor or roof level RL of the terminal 14. Both the tower structure 66 and the building complex 70 are constructed on sound engineering principles and may be supported by columns, pylons or other structures which extend vertically through the terminal 14 and are anchored deep within the ground. The tower structure 66 and the building complex 70 establish a sheltered roof area 74 which is of courtyard design and may be provided with radial or other walks 76 and intervening garden or recreation areas 78. Immediately below the gate control tower 68 is a flight control tower 80 (see FIGS. 4, 12 and 19) having suitable computer equipment and below such flight control tower is a sky restaurant 82. The space 84 beneath the sky restaurant 82 may be divided variously into public office rental facilities. A roof-supported promenade 85 containing rental car offices (not shown) surrounds the building complex 70 since it is intended that such complex shall serve as an airport hotel or "Airtel."

Figure 8:
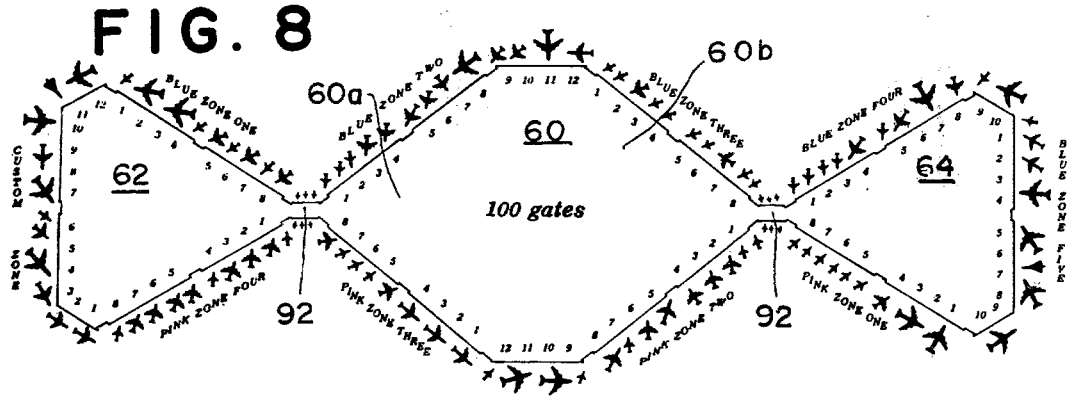
FIG. 8 is a gate plan layout or outline similar to FIGS. 5, 6, and 7 but showing a passenger terminal unit having a full gate complement of one hundred gates.

As is customary in connection with conventional airport terminal buildings, a series of gates is disposed in peripheral fashion around the main passenger terminal 14. Due to the large number of gates which are involved in connection with the terminal 14 only a few of them have been represented in FIG. 4 by the brackets 90. Such gates consist of peripheral extents or areas which have been assigned with arbitrary numerals in FIG. 8, it being apparent that the central section 60 of the terminal 14 is possessed of forty gates and that each of the wing sections 62 and 64 is possessed of thirty gates. The entire completed terminal shown in FIG. 8 is, therefore, possessed of one hundred gates 90 (so labeled in this view).

Figure 5:
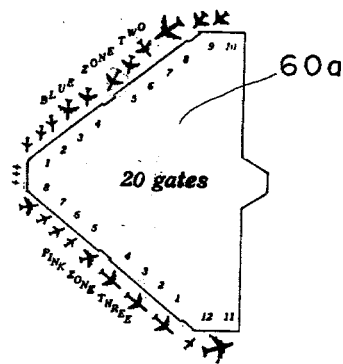
FIG. 5 is a gate plan layout or outline, almost entirely schematic in its representation, of a twenty-gate starter passenger terminal unit which is designed primarily for expansion purposes.

The disclosure of FIGS. 5 through 12 is intended to indicate the manner in which progressive passenger terminal construction operations may be carried out commensurately with the population growth of the associated host city. At the outset, where a relatively smaller major city which ordinarily could be accommodated by an airport terminal having only twenty passenger and cargo gates, the so-called starter terminal unit which is schematically shown in FIG. 5 and is shown in more detail in FIG. 9 would be constructed. This starter unit would embody approximately one-half of the central section 60 of the full complement terminal 14, such starter terminal unit being designated by the reference numeral 60a. For future expansion of the terminal, it is advisable that the entire central tower structure 66 be fully constructed, but as far as the hotel 70, the courtyard 74, and the promenade 84 are concerned, only half portions of such structures are contemplated in the original starter terminal unit.

Figure 6:
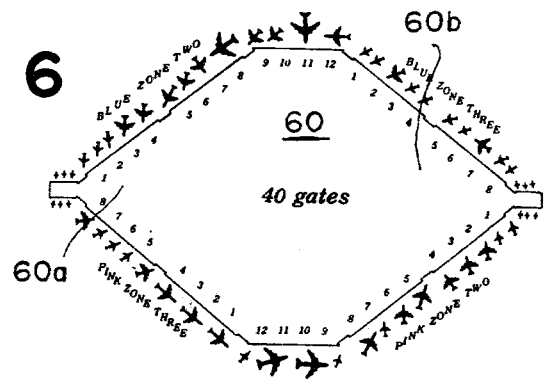
FIG. 6 is a gate plan layout or outline similar to FIG. 5 but showing a forty gate passenger terminal unit which is designed for additional expansion purposes.
Figure 7:
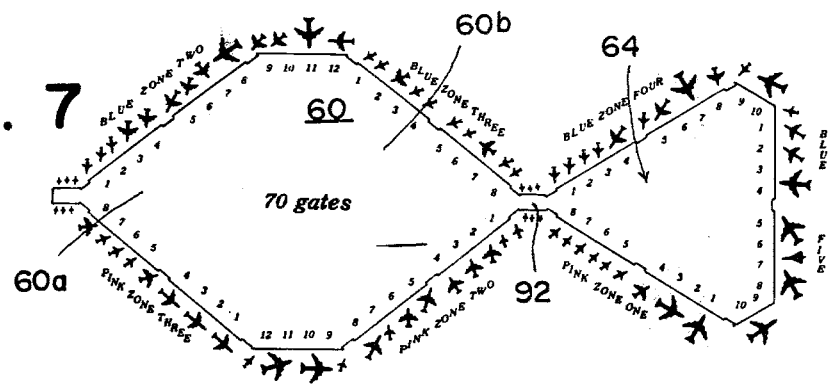
FIG. 7 is a further gate plan layout or outline similar to FIGS. 5 and 6 but showing a seventy-gate passenger terminal unit which is capable of use for still further expansion.
Figure 10:
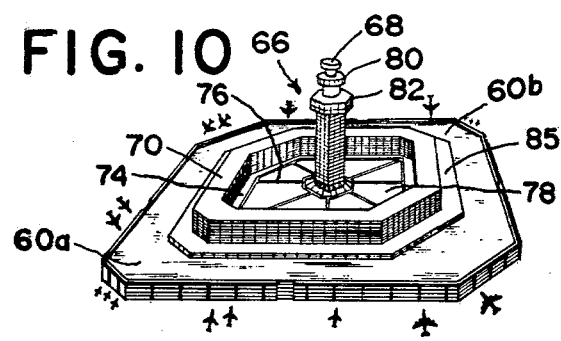
FIG. 10 is a perspective view of the completed forty-gate passenger terminal unit which is schematically shown in FIG. 6.
Figure 11:
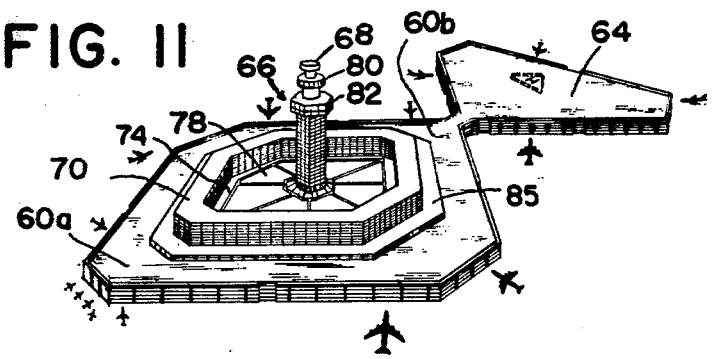
FIG. 11 is a perspective view of the completed seventy-gate passenger terminal unit which is schematically shown in FIG. 7.

At such time as the growth of the host city justifies the addition of further gates to the airport terminal, the twenty gate starter terminal structure may be enlarged by completing the generally parallelogram-type structure as shown at 60b in FIG. 10, thus adding an additional twenty gates and completing a passenger terminal having a total of forty gates as shown in FIGS. 6 and 10. Further growth of the host city may be accommodated by adding the wing structure 64 to the structure of FIGS. 6 and 10 as shown in FIGS. 7 and 11 to provide a terminal having seventy gates, while still further growth of the host city may, in time, warrant completion of the aforementioned "bow tie" arrangement of FIGS. 8 and 12 by adding the wing structure 62 so as to afford a complement of one hundred gates. It will be understood that at the time such building additions are resorted to, various surrounding additions and modifications of the airport complex 10 may be effected, as, for example, the addition of new cargo buildings, the enlargement of existing cargo buildings, the relocation of railway tracks and roadways, etc.

Due to the relatively complete description of the nature and function of the various gates 90 which has been expressed or set forth in my aforementioned U.S. Pat. No. 3,916,588, it is not deemed necessary to elaborate herein on the nature of these gates. It is sufficient to state that such gates refer to a second floor check-in or enplaning area where passengers gather immediately for flight departure from the passenger terminal 14 for the purpose of boarding a particular aircraft, and also on the second level where deplaning passengers enter the building. Such gates include floor areas in the vicinity of the outer building wall and they also include limited areas just outside such wall and on the aircraft ramp area or apron 14. As indicated particularly in FIG. 3 of the drawings, the peripheral location and number of gates 90 are indicated by bracketing wherein it will be observed that there are eight such gates along each of the three major sides of both triangular wing sections 62 and 64, eight gates along each of the four major sides of the central section 60, two gates along each of the minor truncated corners of the wing sections 62 and 64, four gates along each of the outermost sides of the central section 60 and two executive gates 91 along each side of the two narrow neck portions 92 which connect the central section 60 to the wing sections 62 and 64, the total number of commercial gates thus being one hundred as heretofore indicated, the gates 91 not being counted as commercial gates since they are used as private or executive gates to and from aircraft on the apron 41 around the terminal 14. The various gates may vary somewhat in size and disposition, as well as in their passenger conveniences, and in general, the passenger conveniences therefor are disposed on the second floor level 2L and on the ground floor level GL. These passenger conveniences are, in the main, substantially the same as those described in my U.S. Pat. No. 3,916,588 and reference may be had to such patent for a full discussion thereof. The novelty of the present invention is not so much concerned with passenger movement in and about the airport complex 10 as it is with the transportation of freight or cargo which will now be discussed in detail.

It is to be noted in connection with FIGS. 5 to 8, inclusive, that, as shown by the labeling in these views, each side of the building which constitutes the terminal 14 is divided into zones, the zones on one side of the terminal being labeled as pink zones and the zones on the other side of the terminal being labeled as blue zones. The gates 90 which are associated with such terminal sides both within the terminal and on the outside thereof may, in an appropriate manner, be colored accordingly to present both an inside and an outside decor which will assist passengers or others in finding their way to a particular gate for either enplaning or deplaning purposes. The ouside decor will assist pilots in bringing their aircraft to proper positions on the aircraft apron 41. For example, a passenger making inquiry at an information desk or the like may be directed to "blue gate No. 37" or "pink gate No. 5" and the interior decor of the terminal 14 will greatly assist the passenger in finding his or her way to the selected gate.

Before entering into a description of the various cargo-handling and transportation facilities and equipment by means of which such cargo is received, sorted, distributed, dispatched, and otherwise treated, it is deemed appropriate to refer to the explanatory chart of FIG. 35 wherein the nature of the cargo which is undergoing treatment is disclosed, and especially the routing of such cargo from its point of reception to its point of destination. As the term implies, "deplaning" cargo is cargo which arrives at the airport complex 10 by aircraft while "enplaning" cargo is cargo which, regardless of whether it arrives by aircraft, truck, or otherwise, is destined to leave the airport complex via outgoing aircraft. Certain cargo has priorty of handling or movement over other cargo and this situation is explained by certain symbols that are used in the particular chart of FIG. 35. A similar situation is prevalent in connection with passenger baggage. The symbols which appear in the chart of FIG. 35 have been placed appropriately throughout the various views of the drawings but specific reference thereto when describing cargo or baggage movements will be made only when considered necessary.

Referring now particularly to FIG. 35, the heading entitled "CARGO" is, for purposes of discussion herein, considered also to carry mail. The first section of the chart relates to deplaning cargo. The second section of the chart relates to enplaning cargo. The third section relates to deplaning baggage. The fourth section relates to enplaning baggage. As will be made clear presently, cargo is illustrated as being in the form of box-like structures, the routing of which is indicated by triangular symbols such as appear in the chart of FIG. 35. These triangular symbols appear throughout many of the views of the drawings and not only do they have a directional connotation, but also they are possessed of certain markings which explicitly refer to their routings. The last section of the chart relates to special empty cargo containers or carts, as well as to directional considerations, and also to freight distribution via an all-cargo jet facility which is attached to or associated with the cargo building 16 as will be described subsequently.

In the cargo deplaning or first section of the chart of FIG. 35, the solid black triangle relates to cargo which is to be conducted from arriving aircraft to a cargo building for termination at the host city or its environs; the black-rimmed triangle relates to cargo which is to conducted from arriving aircraft to the customs facility at the cargo building 16; and the triangle with the central black dot therein relates to cargo which arrives by aircraft and is to be conducted to a sorting area where it may be slated either for terminating as described above or for rerouting via destination and holding areas to an enplaning aircraft at a designated gate. In the cargo enplaning of the second section of the chart, the triangle with the horizontal midline relates to cargo which is of high priority, is deplaned at one gate and is to be conducted to another gate for enplaning, i.e., jet to jet, within a period of less than two hours for example; the triangle with the dual parallel horizontal lines relates to cargo which is deplaned at one gate and may be held beyond the two-hour period; the triangle with the wavy horizontal line relates to cargo which arrives at a cargo building and is to be conducted to a departing aircraft within the two-hour period; the triangle with the dual wavy horizontal lines relates to cargo which arrives at the cargo building and may be held beyond the two-hour period before being dispatched to a departing aircraft, and the triangle with the crossed lines relates to enplaning cargo arriving by truck to a departing aircraft by way of various distribution centers.

In the baggage deplaning or third section of the chart of FIG. 35, the triangle with the vertical and horizontal lines relates to baggage which has been sent to a baggage claiming station at a passenger deplaning gate for passenger pick up; and the triangle with two vertical lines and one horizontal line relates to baggage which has arrived on a jet at one gate and is sent to a cargo building by way of the passenger terminal for local delivery. In the baggage enplaning or fourth section of the chart, the triangle with the vertical line relates to baggage which goes from one jet to another via a passenger gate or via the aircraft apron; the triangle with the two vertical lines relates to baggage which arrives by truck for delivery to a jet via a truck building and passenger terminal gate; and the triangle with the three vertical lines relates to baggage which is sent from an enplaning passenger gate to the jet.

In the last three sections of the chart of FIG. 35, the triangle with the vertical base relates to either empty cargo containers or carts by means of which containers are ordinarily transported; the triangle with the lower horizontal base relates to directional motion of cargo toward the viewer, while the similar triangle with the upper horizontal base relates to cargo which is moving away from the viewer; and the all black triangle which possesses a vertical line at the apex thereof relates to all cargo, whether enplaning or deplaning, which is transported from a cargo building to an all-cargo jet facility as will be made clear subsequently. The application of such a vertical apex line may be applied to any of the other cargo movement triangles of the chart.

It will be observed that in the chart of FIG. 35, the various triangle symbols have associated therewith special abbreviated or coined non-directional four letter language designations. These latter designations have not been specifically mentioned in the specification and are primarily for reference or identification purposes.

At the risk of repetition, it is pointed out that the architectural features of the present passenger terminal 14, its passenger facilities which are disposed for the most part at ground and second floor levels, certain passageways, corridors, walkways, elevators, escalators, public concessions, and service areas, may remain similar to those shown and described in my U.S. Pat. No. 3,916,588. Additionally, certain cargo processing facilities which take place on the third floor level, vehicular traffic lanes and automobile parking facilities on the third, fourth and fifth floor levels as shown in such patent may also be employed in the present terminal, but they have been omitted from the disclosure herein. The roof facilities such as car rental establishments and other passenger facilities are omitted herein. However, as exemplary of such facilities, there is shown a jetway or passenger bridge 100 in FIGS. 18 and 26 which extends between a parket jet aircraft 102 and the second floor level of the terminal 14, while in FIGS. 19 and 27 certain parked vehicles 103 have been illustrated on the fourth, fifth, and roof levels. These disclosures are only incidental and bear no direct relationship to the present invention which resides largely in certain novel cargo-handling equipment, methods and procedures which, in the main, are concerned with the third floor and basement levels, as well as on the aircraft parking apron which surrounds the passenger terminal and also at the cargo building 16, and such items will now be described in detail.

As shown throughout the various views of the drawings, and particularly to FIGS. 20, 21, 24, 25, 28, 29, 30, and 31, the present invention depends to a large extent upon the use of two known and patented conveyor apparatuses or systems, one of these systems being designed for transporting unit loads of cargo or other material between vertically and laterally separated stations and the other system being designed for simply moving cargo laterally at substantially the same level, or under certain circumstances along a slightly inclined ramp between varying levels. The first system is shown and described in U.S. Pat. No. 3,684,079, granted on Aug. 15, 1972, and entitled "TRANSPORT DEVICE." It consists of a multiple chain and sprocket drive mechanism wherein a plurality of horizontally disposed platforms which are spaced from each other extend between endless chain loops and are effectively movable between various levels so that a unit load of material may be deposited on one platform at a selected level at the same time that another unit load is being removed from another platform at a different level. For example, if a unit load approaches the platform group at a high level in one direction, is received on a platform and caused to descend with the platform, and then is discharged from the platform at a low level, the unit load follows the path of the letter "Z," thus suggesting the name "Z-Loda" which is the trade name which has been given to the system as a whole.

Such trade name is well known in the conveyor industry and is applicable to conveyors of the type where a given load enters an elevator mechanism at one level, is either raised or lowered to a different level, and then leaves the elevator mechanism at a different level but in the same direction.

The "Z-Loda" system as used herein is best illustrated in FIG. 19 wherein it may be observed that containerized items of cargo which throughout this application are labeled C and travel on the third floor level 3L of the terminal 14 to the left as seen in this view and approach and enter one of the "Z-Loda" directional elevator systems 104 where it is deposited on one of a series of platforms 106 which then moves downwardly and is capable of stopping at either the second floor level 2L, the ground floor level GL, or the basement floor level BL. As shown in FIG. 19, the cargo items are capable of being discharged to the left at any of such floor levels for aircraft-loading purposes. The multiple chain and sprocket mechanism by means of which the various platforms 106 are either raised or lowered, and the control mechanism for operating them have not been disclosed herein, and for a full understanding of such mechanism, reference may be had to aforementioned U.S. Pat. No. 3,684,079.

In a modification of the structure shown in U.S. Pat. No. 3,684,079 of Z-Loda Corporation, there is shown and described a directional elevator system of a similar nature but in which a unit load may approach the platform group at a high level in one direction, and after being lowered on one of the platforms, it leaves the elevator mechanism at a low level in a reverse direction. The load thus follows the path of the letter "C." This gives rise to or suggests the name "C-Loda." This latter name also is a trade name and is applicable to conveyors of the type where a given load enters an elevator mechanism at one level, is either raised or lowered to a different level, and leaves the elevator mechanism at a different level but in a reverse or opposite direction.

In the present instance, each of the directional elevator "Z-Loda" systems at the various passenger terminal gates has associated therewith a companion "C-Loda" system, the latter being designated by the reference numeral 105, being arranged alongside the "Z-Loda" system, and being movable bodily with the latter. As will become clear when the nature of the invention is better understood, the various "Z-Loda" systems are essentially down-elevators which are employed for enplaning purposes to transfer cargo items downwardly from the third floor passenger terminal level 3L to the ground floor level GL of the terminal 14 in order that such cargo may be loaded into either the upper or lower loading doors of a parked jet aircraft 102 on the apron 41. The various "C-Loda" systems are likewise essentially down elevators which are employed for cargo-deplaning purposes, that is, to transfer cargo which is discharged from either the upper or lower level doors of the jet aircraft 102 by lowering the same to the basement level BL.

In connection with a "Z-Loda" system 104, and with reference to FIG. 19 of the drawings, it will be observed that two platforms 106 are disclosed in this view. The upward or downward stroke or span of movement of these platforms is such that four platform heights or levels are concerned. In other words, for a full platform movement from the top of the "Z-Loda" system to the bottom thereof, the uppermost platform 106 which is shown in full lines may move from the third floor level 3L to the ground floor level GL for discharge of cargo at this latter level for conduction by a conveyor system to certain low level loading doors which may be associated with the jet aircraft 102 on the parking apron 41 around the passenger terminal 14. The range of vertical operation or movement of the two platforms 106 may be shifted vertically by raising the entire "Z-Loda" system bodily as a unit between its lower full-line position and an upper dotted-line position. When so shifted, the upper platform 106 assumes the dotted-line position of FIG. 19 and it may then be lowered to its other dotted-line position as shown in FIG. 19 for discharge of cargo at an upper level above the ground for conduction to certain high level loading doors which may be associated with the parked jet aircraft 102.

Although the use of a "Z-Loda" system 104 and a "C-Loda" system 105 is not novel, the manner in which they are installed in the passenger terminal building 14 and their use in association with the aforementioned system by means of which cargo units are transported horizontally along the third floor, ground and basement levels possess novel aspects which will be described in detail presently.

The aforementioned second cargo transporting system for moving cargo laterally along substantially the same level, for example, the third floor level 3L, is shown and described in U.S. Pat. No. 3,389,682, granted on June 25, 1966, and entitled "LOW PROFILE CONVEYOR," and U.S. Pat. No. 4,005,787, granted on Feb. 1, 1977, and entitled "APPARATUS AND METHOD FOR UNLOADING DRIVERLESS VEHICLES." Such a transporting system consists of a plurality of continuously moving in-floor directional towlines including two chains 110 (see FIGS. 22 and 23) which carry lug-like impellers 112 that are designed for selective engagement with two vertically extending and slidably mounted tow pins 114 which are mounted on the forward ends of cargo-carrying carts 116. The lower ends of the tow pins 114 project through slots 118 which are formed in the floor and the carts are supported on caster-type wheels 120 so that as the tow pins 114 follow the contours of their respective slots 118, the carts are obliged to follow the movements of the pins 114. In a general way, the system is similar to the operation of the well-known cable cars. The system which is shown in aforementioned U.S. Pat. Nos. 3,389,682 and 4,005,787 is manufactured and sold by S. I. Handling Systems, Inc. of Easton, Pa. It will be understood that the various slots 118 afford a network of paths for travel of the carts 116 in various directions and that some of the slots 118 diverge from each other at juncture regions such as are shown at 122 on the third floor level 3L (see FIG. 20), on the basement floor level BL (see FIG. 28), and also on the ground level which is associated with the cargo building 16 as shown in FIGS. 30 and 31. Computerized control mechanism (not shown) is provided for effecting various programmed switching operations at the selected juncture regions 122 and also for withdrawing the tow pins 114 of each cart 116 from engagement with the impellers 112 (see FIG. 22), the specific withdrawal means being in the form of ramp-like cam members 124 (see FIG. 22) which are positioned adjacent to the slots 118 and are adapted to engage lifting collars 126 on the central portions of the slidably mounted pins 114. For convenience of description herein, the various directional slots 118, together with their underlying tow chains 110, will be referred to simply as the towlines 118, the reference numeral lead lines extending directly to the slots.

Referring now to FIGS. 18, 18a, 19, and 26 of the drawings, the mezzanine level ML, the third floor level 3L, the fourth level 4L, the fifth floor level 5L, and the roof level RL project beyond the second floor level and establish an overhang which overlies the inner portion of the jet apron 41, such overhang being designated by the reference numeral 130 in FIGS. 4, 16, 18, 19, 20, 26, and 27. This overhang 130 affords accommodation for the "Z-Loda" systems 104 and the "C-Loda" systems 105 which are disposed in side-by-side relationship and are laterally shiftable bodily as units by means of traction wheels 132 (see FIGS. 19 and 27) which ride on horizontally extending tracks 134, the latter being disposed within a trough-like depression 136 which is provided in the floor 138 of the basement level BL of the passenger terminal 14. The various "Z-Loda" and "C-Loda" systems may thus be shifted individually betwen the various selected gates 90 (see FIG. 4).

Referring now to FIGS. 19, 20, 21, and 25 of the drawings, each "Z-Loda" system 104 is designed for selective register with a magazine series of longitudinally extending, horizontally extending, power-driven roller conveyors 140, these conveyors being bodily shiftable transversely on horizontal rails 142. Thus, either a given "Z-Loda" system 104 may be shifted into register with a particular conveyor 140 or a particular conveyor may be shifted into register with its particular "Z-Loda" conveyor. In the illustrated form of the invention, each "Z-Loda" system 104 has associated therewith five such conveyors 140. Each conveyor group may be considered as a magazine of conveyors, the individual conveyors each being capable of serving its respective "Z-Loda" system when required.

As shown in FIGS. 20 and 21 of the drawings, the latter figure being merely an enlargement of a portion of the first mentioned figure, and both views or figures being largely schematic in their representation of the third floor level 3L of the drawings, a towline slot 118 extends past and is common to all of the laterally shiftable cargo moving power roller conveyors 140 and traverses the right-hand end of such conveyors as shown in these views. Each power roller conveyor 140 has associated therewith a transfer device 144 (see FIG. 24) by means of which an item of cargo C being transported along the towline on its respective cart 116 may be pushed or shifted from the cart and deposited on the associated conveyor. The transfer devices 144 travel on horizontally extending tracks 145 and follow the lateral motion of their respective conveyors 140.

The various transfer devices are of conventional construction and may be of the general type which is shown and described in U.S. Pat. No. 4,005,787, granted on Feb. 1, 1977, and entitled "APPARATUS AND METHOD FOR UNLOADING DRIVERLESS VEHICLES." Such a transfer device is manufactured and sold by aforementioned S. I. Handling Systems, Inc. of Easton, Pa. under the trade name "Sleep Sweep" but which, for convenience, will be referred to hereinafter as a "clean sweep" mechanism, such name or designation being considered more descriptive of the device's function.

As shown in FIG. 24 of the drawings, each transfer device or clean sweep mechanism 144 includes a vertical reaction frame 146 which serves as a support for a four-bar linkage arrangement of the parallelogram type in which the reaction frame 146 constitutes the base link, a flat pusher plate 148 constitutes the opposite link, and a pair of horizontal swinging links 150 serves to connect the pusher plate 148 to the base link or reaction frame 146. An hydraulic cylinder and plunger assembly 152 supplies the motivating force for causing the pusher plate 148 to traverse the upper surface of the particular cart 116 which is disposed between the clean sweep mechanism and the associated power roller conveyor 140. At such time as the pusher plate 148 traverses the upper surface of the cart 116, the cargo container or other load which is disposed upon the cart will be forcibly slid, ejected or swept from the cart and onto the conveyor 140. From the conveyor 140, the thus transferred cargo load may be conducted to the overhang region 130 of the passenger terminal building 14 and deposited on a properly positioned platform 106 of the associated "Z-Loda" system 104 for lowering thereof to either of two positions above the ground floor level GL as previously indicated in connection with the description of FIG. 19. The various clean sweep mechanisms 144 travel on widely separated, horizontally extending, rails 154 which assimilate the reaction force which is exerted upon the plate 146 at the time the pusher plate 148 is set into operation to sweep a cargo load from its associated cart. The rails 154 are parallel to the conveyor rails 142 and the various clean sweep mechanisms 144 are programmed and electrically motivated in timed relation to the conveyors 140 so that each conveyor at all times has a respective clean sweep mechanism in longitudinal register therewith. The various cargo-carrying carts 116 travel on the towline 118 and are capable of entering between the power roller conveyors 140 and their associated clean sweep mechanisms.

Still referring to FIG. 24 of the drawings, the details of the individual power roller conveyors 140 are more clearly shown in this view than they are in FIGS. 20 and 21, each such conveyor including a rectangular, horizontally extending conveyor frame 160 within which a horizontal series of individual rollers 162 extends, adjacent rollers being slightly spaced apart with all of the rollers being power driven by chain and sprocket mechanism (not shown) as is customery with power roller assemblies of the character under consideration. Walkways or passages 164 (see FIG. 20) extend transversely across the various power roller conveyors 140 where the frames 160 are discontinued in order to enable cargo personnel to cross from one intervening roller conveyor aisle to another. These walkways 164 are, of course, not so wide that cargo cannot flow freely from one set of power-driven rollers 162 to the next set of rollers. At certain locations it may be desirable to transfer a particular cargo container from one roller conveyor line to the next adjacent line and, accordingly, as shown in FIGS. 21 and 24 of the drawings, transversely oriented free cargo shifting wheels 166 are disposed between adjacent rollers 162 and are capable of being raised when a transverse cargo shift is to be made. The desired transfer of cargo containers from one conveyor 140 to an adjacent conveyor may be effected by manually forcing the containers from one conveyor line 140 to the next adjacent conveyor line across intermediate longitudinally shiftable rollers 168 which are capable of being shifted to the desired transfer areas where the transfer from conveyor to conveyor is to be made.

For purposes of description herein and for subsequent claim terminology, the various arrangement of five side-by-side power roller conveyors 140 may be regarded as a magazine of conveyors from which cargo items may be ejected, so to speak, from any conveyor of the magazine individually onto the particular "Z-Loda" system which is associated with the magazine for transfer by said "Z-Loda" system to a different level in the passenger terminal 14 or to the jet apron 41.

Insofar as the passenger terminal 14 is concerned, cargo enplaning facilities by means of which there is manipulated cargo which exists within such building either by reason of it having been brought into the terminal as deplaning cargo from arriving jet or other aircraft, or by reason of it having been brought to the terminal via tow line, truck or otherwise from the cargo building 16, are illustrated in somewhat schematic fashion in FIGS. 18 through 24, whereas cargo deplaning facilities by means of which there is manipulated or treated cargo arriving at the passenger terminal are similarly illustrated in schematic fashion in FIGS. 26 through 28. Both enplaning and deplaning facilities which take place at the cargo building 16 (see FIG. 1) are schematically illustrated in FIGS. 29 and 30 of the drawings. At the passenger terminal 14 enplaning facilities utilize "Z-Loda" systems 104 in their operation, while "C-Loda" systems 105 are used in deplaning operations at said terminal.

Referring now to FIGS. 18 and 18a, wherein cargo-enplaning facilities and operations which take place on the apron 41 which surrounds the passenger terminal 14 are disclosed, the "Z-Loda" system 104 of these figures projects downwardly through a horizontally extending slot 170 which is formed in the apron 41, extends parallel to the adjacent building side, and establishes communication between ground floor level GL and the basement level BL of said terminal. This slot 170 is provided for the purpose of affording clearance for the particular "Z-Loda" system 104 which projects therethrough, the slot 170 also being shown in FIG. 19. It will be understood that each gate 90 which is equipped with both a "Z-Loda" system 104 and a "C-Loda" system 105 will have a slot 170 associated therewith and within which both such elevator systems are laterally shiftable. Similar slots 172 and 174 are also formed or provided in the floors of the mezzanine level ML and third floor level 3L of the terminal 14, such slots being designed for the purpose of affording clearance for lateral shifting of the associated "Z-Loda" system 104 and the "C-Loda" system 105. These latter slots are both formed in the building overhang 130. The floor of the fourth level 4L is cut back as shown at 173 (see FIGS. 18 and 18a) around the perimeter of the building for high level use of the "Z-Loda" system.

Still referring to FIG. 18 of the drawings, the jet aircraft 102 which is shown as being parked on the apron 41 of the passenger terminal 14 of the airport complex 10 is provided in its fuselage with lower and upper cargo-loading doors both in front of and behind the starboard wing 175, the front lower and upper doors being designated, respectively, by the reference numerals 176 and 177 and the rear lower and upper doors being designated, respectively, by the respective reference numerals 178 and 179. Cargo containers or items C which are brought downwardly from the third floor level 3L of the terminal 14 by the "Z-Loda" system 104 are conducted to these doors in a selective manner by means of generally horizontal conveyors including a contractible and extensible main conveyor 180 which extends outwardly from the associated "Z-Loda" system 104 and a pair of laterally extending contractible and extensible, generally horizontal conveyors 182 and 184, the former serving the aircraft front lower and upper doors 176 and 177 and the latter serving the aircraft rear lower and upper doors 178 and 179. As shown in FIG. 18, when the laterally extending conveyors 182 and 184 are in their operative position for cargo-enplaning purposes, they are respectively disposed fore and aft of the adjacent wing 175 of the parked jet aircraft 102. The main conveyor 180 may be of the portable type, which is to say that it is supported on caster-type wheels 186 so that it may be rolled into position in front of and in register with the adjacent "Z-Loda" system 104, the position of which is adjusted to accommodate the span of the starboard wing 175 of the aircraft 102. The laterally extending conveyors 182 and 184 are likewise provided with caster-like wheels so that they are mobile and may be properly positioned so as to span the distance between the conveyor 180 and the aforementioned doors 176, 177, 178, and 179 in the fuselage of the aircraft 102. All three of the conveyors have roller-carrying platforms which are capable of being raised to accommodate the height of the upper doors 177 and 179, or lowered to accommodate the height of the lower loading doors 176 and 178.

The main conveyor 180 is preferably of the power roller type and may be similar in this regard to the aforementioned power roller conveyors 140 which are provided on the third floor level 3L of the terminal building 14. Accordingly, they are provided with a longitudinal series of power-driven, transversely-extending rollers 187 and vertically movable, lateral cargo-shifting wheels 188 which are similar to the wheels 166 of FIG. 21. The wheels 188 may be assisted by clean sweep mechanisms 144 which are located on one side of and are carried by the main conveyor 180. The conveyors 182 and 184 may also include power rollers, but, preferably, they are equipped with free rolling transport rollers 189. Small portable elevators or lifts 190 may be employed in the immediate vicinity of the doors 176, 177, 178, and 179 for the loading of baggage or other special cargo items into the storage compartments in the fuselage of the aircraft 102. If desired, flat, rectangular, caster-supported platforms 191 may be interposed between the aircraft doors being used and the ends of the conveyors which are adjacent to the aircraft fuselage. These platforms are vertically adjustable for door and conveyor-aligning purposes and are designed and adapted to hold or support a large number of cargo items either while they are about to be introduced into the aircraft in connection with cargo-enplaning operations or while they are about to be slid onto the conveyors 182 and 184 in connection with cargo-deplaning operations. In lieu of the platforms 191 which in some instances may have power-operated belts or rollers for cargo-moving purposes, conventional belt conveyors (not shown) may be used.

It has been previously stated that the jet aircraft 102 on the parking apron 41 may be provided with upper high level loading doors 177 and 179 and with lower low level loading doors 176 and 178. When cargo is being enplaned through the high level doors 177 and 179, the conveyor roller levels will assume their full-line raised positions as shown in FIGS. 18a and the cargo which is transferred thereto from the associated "Z-Loda" system 104 will be deposited on the platform 106 on the third floor level 3L of the terminal 14 by means of a ramp-like conveyor section 192 (see FIG. 19) which is capable of being raised to its dotted-line position for deposition of cargo items C into the "Z-Loda" system 104 when the range of the platform levels of such "Z-Loda" system is shifted to its uppermost extent. The conveyor section 192 is provided with a hinge connection 194 which permits its vertical swinging movement to its dotted-line ramp-like position. Power means (not shown) may be provided for shifting the ramp section 192 between its raised inclined position and its lowered horizontal position. When the cargo is being enplaned through low level doors 176 and 178 in the fuselage of the aircraft 102, the range of the platforms 106 of the "Z-Loda" system 104 will be shifted downwardly as previously described and cargo will be deposited from the registering conveyor 140 onto the upper platform of said "Z-Loda" system 104 as shown in full lines in FIG. 19 and will be discharged from the "Z-Loda" system onto the main conveyor 180 which, at that time, will assume its low level position as shown in FIG. 18, and also shown in dotted lines in FIG. 18a.

At the risk of repetition, it is stated that insofar as is practicable, cargo-enplaning operations and the structure which is involved for making such enplaning operations possible have been disclosed in FIGS. 18 through 25 of the drawings. To summarize these enplaning operations at the various gates 90, cargo containers C which are carried on the carts 116 that follow the towline 118 which passes the clean sweep mechanisms 144 and the right-hand ends of the various roller conveyors 140 as viewed in FIG. 20 are conducted by such conveyors to the overhang region 130 of the terminal 14 where they are deposited on the "Z-Loda" systems 104 at the third floor level 3L of the terminal. These cargo containers C are then lowered by the "Z-Loda" systems 104 to ground level GL where they are conducted outwardly over the jet aircraft apron 41 by means of the conveyors 180 and then are conducted laterally by the conveyors 182 and 184 and loaded into the jet airplanes 102. When the upper doors 177 and 179 of the airplanes are undergoing loading, the level of the conveyor platforms will be raised and when the lower doors 176 and 178 of the parked airplanes on the apron 41 are undergoing loading, the level of the conveyor platforms will be lowered. More often than not, jet aircraft having dual lower and upper doors will ordinarily be loaded through the lower doors and then, when a full load complement has thus been enplaned, the upper doors will be used for loading purposes.

As previously stated, cargo deplaning operations are, insofar as practicable, illustrated in FIGS. 26 through 28 and 28a, and much of the involved structure has been previously described in detail in connection with enplaning operations which were set forth in the description of FIGS. 18 through 25. Considering now the apron layout structure shown in FIG. 26, deplaning cargo leaving the front and rear lower doors 176 and 178 of the jet aircraft 102 is conducted on the lateral conveyors 182 and 184, transferred to the common or main conveyor 180, and then caused to move inwardly toward the main terminal building 14 where it is deposited in the associated "C-Loda" system 105. It will be understood that the power-driven rollers of the deplaning conveyor 180 will be driven in a reverse direction so that the cargo will move in the proper direction, that is, towards the terminal building 14.

Whereas in FIG. 18a, which is illustrative of cargo-enplaning operations, the power roller level is shown as being in its raised full-line condition for upper level enplaning of cargo, in FIGS. 26 and 27 which are illustrative of cargo-deplaning operations, the power roller level is shown as being in its lower position for low level deplaning operations. Although this low level transfer of cargo to the "C-Loda" system 105 is portrayed in FIG. 26, it will be understood that upper level deplaning of cargo may take place with the power rollers 187 of the main conveyor 180 at their raised level as shown in dotted lines in FIG. 19. In the upper level conveyor position, cargo will be deposited on one of the platforms 106 of the "C-Loda" system 105 slightly above ground level GL, while in the lower level conveyor position cargo will be deposited on a platform at approximately ground floor level. In either event, for deplaning operations, the "C-Loda" system 105 is operated to lower the cargo which is received thereby through the slot 170 (see FIGS. 26 and 27) to the basement floor level BL where it is then conducted on a vertically adjustable power roller transfer platform 200 from whence it is conducted to the left by a hinge conveyor ramp section 201 as seen in FIG. 27 and routed by means that will be described subsequently as enplaning cargo.

If the deplaning cargo arriving on the jet aircraft 102 of FIGS. 26 and 27 is unloaded from the upper level aircraft door 177 and 179, the range of movement of the platforms 106 of the "C-Loda" system 105 will, as previously pointed out, be adjusted to receive the cargo at the dotted-line level of FIG. 27, and if such deplaning cargo is unloaded from the lower level aircraft doors 176 and 178 of the aircraft, the range of movement of the platforms 106 will be adjusted to receive the cargo at the full-line level of FIG. 27. In the former instance, the cargo will be transferred from the cargo-receiving platform of the "C-Loda" system 105 to the transfer platform 200 while the latter is in an elevated position and the hinged conveyor ramp section 102 is in a downwardly and outwardly inclined position as shown in dotted lines in FIG. 27. In the latter instance, the cargo will be transferred from the cargo-receiving platform 106 of the "C-Loda" system 105 to the transfer platform 200 when the latter is in its lowered position and the hinged conveyor ramp section 201 is in horizontal alignment therewith as shown in full lines in FIG. 27. In either instance, the power roller transfer platform 200 will discharge the received cargo onto the hinged conveyor ramp section 201 and the latter in connection with operation will discharge the cargo to the left as shown in FIG. 27. Adjustment of the range of operation of the "C-Loda" system 105 to accommodate either high level or low level receiving and discharge of deplaning cargo will be resorted to in a manner similar to that previously described in connection with high and low level enplaning of cargo.

Still referring to FIGS. 27 and 28 of the drawings, deplaning cargo which has arrived on the jet aircraft 102 and is deposited on the "C-Loda" system 105 leaves the latter at basement level and travels to the left as viewed in FIG. 27 where it is first deposited on the transfer platform 200 and moved to the left and then on the ramp section 201 and moved to the left as shown in FIG. 28. The programmed automated computerized deplaning terminating cargo after being discharged by the conveyor ramp section 201 is conducted onto passing empty carts which are associated with a local towline 118. The latter is specifically labeled 202 and passes directly across the discharge end of the conveyor ramp section 201 as shown in FIG. 27. An express towline 118 which is labeled 203 extends generally parallel to the local towline 202, and a series of crossover towlines 118 which are labeled 204 extend between the two parallel towlines 202 and 203 as shown near the bottom of FIG. 28 for bypass purposes, the bottommost or express towline 203 serving to assimilate some of the cargo on the other towline 202 to thus avoid cargo congestion. The local towline 202 eventually joins the express towline 203 and the latter towline extends to the cargo building 16. This back and forth transfer of cargo from one towline to the other may take place at a plurality of regions along these towlines as clearly shown in FIG. 29 where the lines are shown as following the peripheral contour of the passenger terminal building 14 and extending generally beneath the buliding overhang 130. Movement of the cargo-carrying carts C along the towlines 118 is preferably computerized.

As best shown in FIG. 28 of the drawings, such cargo as is being lowered by the "C-Loda" system 105 at any one of the gates 90 and which, instead of being conducted to the cargo building 16 as deplaning-terminating cargo, is to be transferred for return as enplaning cargo to the third floor level 3L of the passenger terminal 14, is swept from the power roller transfer platform 200 by one of the clean sweep mechanisms 144 (see either the right or lefthand side of FIG. 28) and deposited on an elongated, horizontally extending, power roller shuttle 205 where it is conducted to the left as viewed in FIG. 28 for deposition by a series of spaced apart clean sweep mechanisms 144 and in a selective manner onto a plurality of horizontally extending power roller conveyors 206 which may be similar to the power roller conveyors 140, extend at right angles to the slot 170, and are equipped with lateral transfer wheels which are similar to the wheels 166 of FIGS. 21 and 24. Intervening longitudinally extending rollers 208 which are similar to the rollers 168 of FIG. 21 may also be provided between adjacent roller conveyors 206 for transfer of cargo from one conveyor to the next conveyor when desired. The various roller conveyors 206, in effect, constitute a magazine of conveyors by means of which individual cargo items may be selectively shifted from the power roller shuttle 205 into cooperation with a local towline 118 which is labeled 209 and extends across the discharge or inner ends of such conveyors 206 as shown in FIG. 28, the programmed and automated computerized cargo items being deposited on cargo-carrying carts 116 which are associated with the towline 209. Weighing scales 210 are associated with the towline 209 at appropriate locations. Crossover towlines 118 which are labeled 211 extend between the local towline 118 and an express towline 118 which is labeled 213 and bears the same relationship to the local line as the previously mentioned express towline 203 bears to the local towline 202 as shown at the lower portion of FIG. 28. A curved crossover towline 118 which is labeled 215 in FIG. 28 extends between the express towline 213 and a towline 118 bearing the label 217 whereby cargo carts 116 are then conducted to the right as seen in this view. The towline 217 extends to a reverse curved crossover towline 118 bearing the label 219 (see FIG. 29) that, in turn, extends to one of two ramps 220 which appear in FIGS. 13 and 14 and lead upwardly to the third floor level 3L of the passenger terminal 14 so that they may enter the handling system for transfer as programmed automated and computerized enplaning cargo as previously described in connection with FIGS. 19, 20 and 21. As shown in FIGS. 13 and 14, the ramps 220 are dual-level ramps, the lower levels 222 thereof accommodating the towline 118 and the upper levels 224 accommodating vehicular traffic.

It is to be noted at this point that the ramps 220, which appear in FIGS. 13 and 14, are associated with a twenty-gate starter unit passenger terminal, but it will be understood that when building additions are made as previously described to produce the forty, seventy, and one hundred gate passenger terminals, such ramps will remain intact but they will be concealed within the buildings as shown in FIGS. 4, 10, 11 and 12.

Further considering FIG. 29 in greater detail, this view is a basement level BL outline of the passenger terminal 14 and it illustrates in diminutive schematic fashion the various multiple basement level arrangements which are shown in greater detail in FIG. 28 and include the previously described "Z-Loda" systems 104, th "C-Loda" systems 105, the associated slots 170 for the two types of systems, the clean sweep devices 144, the power roller shuttles 204, the magazines of conveyors 206, and the various towlines 118. FIG. 29 is representative of a twenty-gate starter terminal, the left side of this view representing facilities for handling ten gates in one wing of such building and the right side of the view representing facilities for handling ten gates in the other wing of the building. The two sides of this view are substantially mirror images of each other.

It will be observed that in FIG. 29, the left hand towline 217 leads through a crossover curved towline 225 to one of the two ramps 220 of the passenger building 14, while the other or right towline 217 and the crossover line 219 leads to the other ramp 220. Thus, cargo which is destined for enplaning and is derived from a parked jet aircraft 102 on the apron 41 at either wing of the terminal 14 is conducted to the third floor level 3L via one or the other of the two ramps 220 by towline means. After such cargo has reached the third floor level 3L, it enters the cargo handling system in the manner previously described in connection with FIG. 21 and passes across the receiving ends of the magazine of power roller conveyors 140 for cooperation in a computerized and selective manner and is swept by the clean sweep mechanism 114 from the carts 116 and deposited on the conveyors 140 for enplaning routing in the manner set forth previously.

Returning again to FIG. 29 of the drawings, it is not deemed necessary to trace all of the various illustrated towlines 118 and their juncture regions. The most important or salient towlines and the cargo-motivating structure which is associated therewith, such, for example, as the magazines of conveyors 206, the shuttles 205, the "Z-Loda" systems 104, the "C-Loda" systems 105, and the ramps have been previously described in considerable detail and their function should be well understood. However, it is to be noted that an area which is designated generally by the reference numeral 230 represents a sorting area, and the outflow towline 118 which is labeled 217 is for conduction to the third floor level 3L of the passenger terminal 14 for cargo-enplaning purposes as set forth previously. Also in each side of the terminal is an area which is designated by the reference numeral 232 which represents a cargo destination holding area where the computer equipment dispatches the cargo on a programmed time basis, as well as on a programmed destination basis according to cargo priorities. By tracing the various towlines 118 and their junctures 122, it will be seen that the cargo within the sorting area 230 may variously be sent or forwarded directly to the towline 217 for dispatch to the cargo building 16, or to the holding area 232 for subsequent transfer in the passenger terminal to third floor level enplaning operations via the ramps 220. An area 234 between the two passenger terminal sides is reserved for vehicle parking purposes.

Considering now the nature of the cargo building 16 of FIGS. 30 and 31 of the drawings, such building is preferably of generally rectangular outline except for the provision of a substantially L-shaped annex or addition 250 (see FIGS. 1, 30, 31 and 32) at one corner of the building. The cargo building proper 16 is a single level structure with partial basement areas while the annex which hereinafter is referred to as the cargo facility is comprised of a ground level which is labeled +1 and a basement level which is labeled −1, the latter level being disclosed in FIG. 32.

A below grade or underground towline 251 (see FIG. 1) extends between the cargo building 16 and the passenger terminal 14 and serves to deliver enplaning cargo from the former building to the latter building, while a similar below grade towline 252 between the two buildings serves to deliver deplaning or terminating cargo from the passenger terminal to the cargo building. It is to be noted at this point that because the cargo building 16 is disposed within the parallelogram-like confines of the four runways 30, 32, 34 and 36 and is, therefore, adjacent to the aircraft apron 41 around the passenger terminal building 14, the routing of cargo to and from the two buildings 14 and 16 is extremely short and considerable time is saved as compared to airport complexes where the cargo buildings invariably are disposed near the periphery of the airport, sometimes as much as a mile or more from the main passenger terminal. This close proximity of the cargo building 16 to the terminal 14 is an important adjunct or feature of the present invention.

A series of automotive trucks 253 (shown in solid black in FIG. 30) is parked along the north wall of the building 16 and a similar series of such trucks 254 is parked along the west wall of the building. Such trucks are designed to conduct deplaning terminating cargo for local delivery in the environs of the airport complex 10. Another series of trucks 255 (white) is shown as being parked along the south wall of the cargo building 16 and these trucks deliver originating enplaning cargo from local areas, such cargo being programmed for ultimate delivery to various jet aircraft at the gates 90 of the terminal building 14 after being processed within the cargo building 16, the automated computerized delivery being made through the underground towline 251 of FIG. 1. Additional enplaning cargo trucks 258 which are parked along the east wall of the cargo building 16 deliver high priority cargo within a two-hour priority period for enplaning on a particular jet aircraft at the passenger terminal 14 where commercial airline offices containing cargo-transmitting data systems for programming enplaning and deplaning cargo for automated computerized cargo-handling systems are located. Within the confines of the cargo building 16 are numerous freight offices 260. An elongated enplaning cargo sorting area is designated by the reference numeral 264 in FIG. 30, while a similar deplaning cargo sorting area is designated by the reference numeral 266. A terminating cargo sorting area is identified by the reference numeral 267, while a U.S. customs is identified by the reference numeral 268. An air mail post office area 270 for volume mail is disposed near the southeast corner of the cargo building 16 and receives deplaning mail from a turnoff towline 118a leading to the towline 257.

A series of towlines extends variously throughout the cargo building 16 and interconnects the various cargo-sorting or treating systems. These towlines have collectively been designated by the reference numeral 118 but have not been specifically labeled, the directional arrows which are associated therewith being deemed sufficient for cargo routing and tracing purposes. Suitable scales 210 are appropriately disposed adjacent to such towlines where needed. Various spaces indicated at 272 are reserved for the storage of empty cargo containers or carts.

It is to be noted that FIGS. 30 and 31 of the drawings are counterparts of each other, a portion of FIG. 30 being repeated in FIG. 31 so that a partial overlay of these two views represents the entire composite cargo building 16 including the aforementioned L-shaped cargo facility 250.

The cargo facility 250 (see FIGS. 31 and 32) embodies a ground level as shown in FIG. 31 and a basement level as shown in FIG. 32, these levels being labeled +1 and −1, respectively, as previously stated. The former level is used for enplaning cargo purposes and the latter level is used for deplaning cargo purposes.

Considering now the enplaning operations which take place on the ground floor level +1 a of the cargo facility 250 of the cargo building 16, and referring particularly to FIGS. 31 and 33, enplaning cargo which enters such facility at ground level by a towline 118 which is labeled 274 passes selectively through a towline arrangement 276 which is similar to the towline arrangement which feeds the various power roller conveyors 140 of FIG. 25. Clean sweep devices 144 selectively push the cargo items from the towline arrangement 276 in a selective manner onto power roller conveyors 278 which are similar in design and function to the aforementioned power roller conveyors 140 of FIG. 20. Actually, the enplaning layout structure of FIG. 31 is quite similar to the enplaning layout structure of FIG. 20 insofar as the slot 170 accommodates one "Z-Loda" system 104, and a "C-Loda" system 105. The "Z-Loda" system 104 is capable of vertical shifting movement in order to accommodate the upper cargo doors of a parked jet aircraft 102 on an apron 282 which partially encompasses the cargo facility 250. A main conveyor 284 which is similar to the main conveyor 180 of FIG. 18 and branch conveyors 286 and 288 which are similar to the branch conveyors 182 and 184, accommodate and service the jet aircraft 102 on the apron 282, these conveyors being capable of being raised and lowered in conformity with the platform level of the "Z-Loda" system 104 in the cargo facility 250. When cargo items are transferred across one of the sections of said power roller conveyors 278 via the "Z-Loda" system 104 directly to the main conveyor 284 for high or low level enplaning purposes, the "C-Loda" system 105 will be pushed to one side and the "Z-Loda" system 104 will take its place in register with the selected section of the magazine of power roller conveyor 278. Instead of transferring cargo from one of the sections of the power roller conveyors 278 to the main conveyor 284 by way of the aforementioned "Z-Loda" system 104, a power-driven transfer roller (not shown) may be employed.

Still referring to FIG. 31 of the drawings, occasionally misdirected cargo items will be forwarded from the cargo building 16 along the towline 274 and through the towline arrangement 276 which is not programmed for enplaning on the jet aircraft 102 which is associated with any of the conveyors 278. Such items will not be transferred by the clean sweep devices 144 to the conveyors 278 and thus they will continue past the last of the conveyors and turn to the right as seen in FIG. 31 where they will encounter a "Z-Loda" system 104a which lowers them to below grade level where they will follow the dotted-line arrangement 291 of towlines 118 (also shown in full lines in FIG. 32) and be returned by an underground towline 292 to the cargo building 16 for resorting or redistribution, possibly as enplaning cargo which is to be forwarded to the passenger terminal 14 or as terminating deplaning cargo for city delivery or elsewhere. The purpose of the towline arrangement 276 is to afford storage facilities for holding cargo items that may build up and establish a cargo excess before it is programmed for transfer by the clean sweep devices 144 to the power roller conveyors 278. If desired, the towline 292 may be provided with a turnoff 292a for transferring enplaning cargo via a "Z-Loda" system 104b from −1 level to +1 ground level into the aforementioned enplaning cargo system including the towline 276.

Continuing with reference to FIG. 31, certain jet aircraft are equipped with nose-loading doors at varying levels and provision is made for accommodating such aircraft. Accordingly, a nose-loading jet aircraft 102n is shown as being parked on the sourth side of the apron 282 alongside the south wall of the cargo facility 250 and cargo items which are programmed for nose-loading therein leave the cargo building 16, pass along the towline 118 bearing the label 274, and then turn laterally and enters a storage towline area or arrangement 293 which is similar to the towline arrangement 276, after which it encounters a "Z-Loda" system 104b. The function of this latter "Z-Loda" system is to elevate the cargo items to a proper level for enplaning of the same into the nose door or doors of the jet aircraft 102n. In the absence of a nose-loading jet aircraft 102n on the apron 282, or a delay in the arrival of such an aircraft, the towline storage area 271 has sufficient capacity to retain the cargo until the aircraft arrives. Misdirected cargo items may be directed by a towline section 296 to the "Z-Loda" system 104a for lowering to below ground level and conduction through the towline arrangement 291 as heretofore described in connection with the return of cargo items from the towline arrangement 276.

Considering now FIG. 32 which is representative of cargo-deplaning operations at the jet cargo facility 250, the layout of the (−1) basement level of this facility is similar to the (+1) ground level previously described in connection with FIG. 31. However, the slot 170 which is shown in this latter view, instead of being provided with a "Z-Loda" system 104, is provided with a single "C-Loda" system 105 and, also, such layout incorporates some of the features of the layout which was described in connection with the deplaning operations of FIG. 28 at the basement level BL of the passenger terminal 14. Empty cargo carts enter the (−1) basement level of the jet facility 250 from the cargo building 16 by means of an underground towline (not shown) which directly underlies the aforementioned towline 118 bearing the label 274 in FIG. 31 and such carts then pass through a towline arrangement 292 similar to the arrangement 276 of FIG. 31 or the towlines 209, 211 and 213 of FIG. 28. As the empty carts traverse the inner ends of the magazines of power roller conveyors 294 (see FIG. 32), they receive cargo containers which have been deposited thereon in a selective manner from the deplaning aircraft 102 which discharges its cargo by means of the main conveyor 284 and the branch conveyors 286 and 288 in the manner previously described in connection with the deplaning of cargo in FIG. 26. Cargo items leaving the main conveyor 284 on the apron 282 are transferred from ground level downwardly to the (−1) basement level of the cargo facility 250 by means of a "C-Loda" system 105 (see FIG. 34) within the slot 170 of FIG. 32 and deposited on a transfer platform 300 which is similar to the platform 200 of FIG. 28. From the transfer platform 300, the cargo units are deposited selectively on a shuttle 304 similar to the shuttle 205 of FIG. 28 from which clean sweep mechanisms like the mechanisms 144 push them onto the magazine of power roller conveyors 294. As the empty cargo carts of the towline arrangement 292 pass the inner ends of the conveyors 294, they enter the towline system and bypass the "Z-Loda" system 104b as indicated and enter the towline system bearing the label 291 from whence these cargo carts, now carrying cargo containers, are returned through the towline 118 bearing the label 292 back to the cargo building 16 for distribution according to their respective designations.

Cargo items which are deplaned from the nose-loading jet 102n at the south end of the apron 282 which partially encompasses the jet facility 250 is carried downwardly by the "Z-Loda" system 104a to (−1) basement level of the facility 250 and then after entering the handling system and is directed through the towlines 118 bearing the labels 291 and 292 back to the cargo building 16 for appropriate handling as heretofore described.

It is well to consider at this point for a better understanding of the cargo deplaning facilities shown in connection with FIG. 31 and with the cargo deplaning facilities shown in connection with FIG. 32 that these enplaning and deplaning facilities to a certain extent are comparable with the cargo enplaning and deplaning facilities which are portrayed in FIGS. 20 and 28, respectively. Another consideration that should be borne in mind when considering the present description of the drawings is that in order to avoid an unduly large number of reference numerals and possible confusion with regard thereto, all of the "Z-Loda" systems which are referred to throughout this specification have usually been designated by the reference numeral 104, while all of the "C-Loda" systems have been designated or identified by the numeral 105. However, in certain instances where a particular "Z-Loda" system or a particular "C-Loda" system performs a function not necessarily associated with passenger gate enplaning or deplaning, suffixes "a," "b" and the like has been applied to the numerals 104 and 105. Similarly, practically all of the towline arrangements including the specific towline facilities such as the tow pins 114, the slots 118, the lifting cam members 124, the lifting collars 126, etc., shown in FIGS. 22 and 23, have been designated by the reference numeral 118 with arrows on their lead lines. Specific towlines that require special mention due to a particular function may be readily located by the use of different reference numerals having no such arrows on their head lines. The same is true in connection with all jet airplanes which have been designated by the numeral 102 even though the various airplanes may not, in fact, be of the same type. An exception is the nose-loading jet 102n of FIGS. 31 and 32.

At an early point in the present specification, a discussion was made of the manner in which the airport complex 10 of FIG. 1, and particularly the passenger terminal 14 might be progressively erected to accommodate growth of the host city with which the complex is associated. A discussion of FIGS. 5 through 12 indicated how a twenty-gate starter terminal unit might be progressively built up until a full complement of one hundred gates may be accommodated. FIG. 17 illustrates the fact that at the outset when a starter unit or terminal 62 is erected the complex layout remains substantially the same as the completed complex with its one hundred gates as shown in FIG. 1.

FIG. 2 is presented in the drawings of this application to illustrate the fact that, due to metropolitan growth, it may be found desirable to add an additional cargo building 16a to the complex in the immediate vicinity of the passenger terminal 14, such additional building embodying a cargo facility 250a which is similar to the cargo facility 250. In such an instance, a slight modification of the taxiways 40 will be resorted to and the second cargo building 16a will be positioned on a grassy area which exists within the north confines of the intersecting airstrips 30, 32, 34 and 36. Otherwise, the layout of the complex remains substantially the same as the complex of FIG. 1.

The invention is not to be limited to the exact arrangement of parts shown in the accompanying drawings or described in this specification as various changes in the details of construction may be resorted to without departing from the spirit of scope of the invention. For example, whereas in FIGS. 13, 14, 15 and elsewhere in the drawings, containerized cargo items on carts are shown as being conducted by a towline arrangement 118 upwardly from the basement floor level BL to the third floor enplaning level 3L of the passenger terminal 14 by means of ramps 220, it is within the purview of the invention to utilize other cargo-elevating means for this purpose. Instead of such ramps 220, or in addition to such ramps, suitable "Z-Loda" or "C-Loda" systems such as those variously shown throughout the drawings and designated at 104 may be used if desired. Furthermore, it is immaterial whether the "Z-Loda" system 104 and the "C-Loda" system 105 of each pair at the various passenger terminal gates 90 be connected to each other for lateral shifting movement in unison or whether they be independently shiftable within their respective slots 170, the only requisite being that one or the other may be shifted laterally into register with a selected power roller conveyor 140 when the occasion demands. Still further, while the so-called "bow-tie" outline of the passenger terminal 14 has been preserved as concerns the passenger terminal of my aforementioned U.S. Pat. No. 3,916,588, passenger terminals having other peripheral contours may be employed, the main criterion being that an upper level of such terminal be reserved for the handling or routing of enplaning cargo and that the basement level of the terminal be reserved in the main for deplaning cargo-handling or routing operations. Finally, it is contemplated that the various "Z-Loda" systems 104, the "C-Loda" systems 105, and the shuttles 205 be capable of transfer from gate to gate if desired. For example, as shown in FIGS. 18a and 25, and also elsewhere, whereas the individual "Z-Loda" systems 104 are shown as being slidable sidewise in their respective individual slots 170 adjacent to their associated gates 90, it is contemplated that the slots within which the "Z-Loda" systems and the "C-Loda" systems, or the tracks on which the shuttles travel, may be interconnected so that in the event of mechanical failure of a given elevator or transfer mechanism, the next adjacent mechanism may be shifted into position as a back-up unit after the same is lowered to clear the overhang 130. Thus, for example, if the "Z-Loda" system for gate No. 35 becomes inoperative for any reason, the "Z-Loda" system at gate No. 34 or gate No. 36 may be slid into position at gate No. 35. This use of back-up units in this manner is contemplated for the cargo-moving equipment both at the passenger terminal 14 or at the cargo jet facility 250.

Therefore, only insofar as the invention is particularly pointed out in the accompanying claims is the same to be limited.

Having thus described the invention what I claim as new and desire to secure by letters patent is:

1. An industrial and urban airport complex embodying a substantially large tract of land and including a system of aircraft landing and take-off runways surrounding and defining an aircraft loading and unloading apron, a multi-level passenger terminal located on said apron and including a ground floor level, a below grade level, and an upper floor level, means defining a series of passenger and cargo gates arranged peripherally around said terminal substantially at the level of said apron, a first cargo down-elevator for each gate and effective to transfer enplaning cargo items from said upper floor level to substantially the level of the apron, a second cargo down-elevator for each gate and effective to transfer deplaning cargo items for substantially the level of the apron to said below grade level, a cargo building disposed in the immediate vicinity of the apron and within the surrounding confines of said runways, a first in-floor towline for transporting enplaning cargo items from the cargo building to and along said upper floor level of the passenger terminal, a second in-floor towline for transporting deplaning cargo items from said below grade level of the passenger terminal to the cargo building, said first and second in-floor towlines having associated therewith wheeled carts for carrying the cargo items, said first in-floor towline having a section extending along said upper floor level in spaced relation with the gates, plural means on said upper floor level for selectively transporting enplaning cargo items from the first in-floor towline section to each of the first cargo down-elevators, each of said plural means comprising a horizontal power conveyor extending between one side of the first in-floor towline section and the associated first cargo down-elevator and a transfer device on the other side of said first in-floor towline section for forcibly sliding cargo items on one of said cargo carts of said first in-floor towline section and in alignment with said conveyor onto the conveyor for delivery by the latter to said associated first cargo down-elevator, means on said below grade level for transporting deplaning cargo items from each of said second cargo down-elevators to the carts of the second in-floor towline, and reversible conveyor means movably disposed on said apron for selectively conducting enplaning cargo items to an aircraft on said apron and adjacent to one of the gates from the first cargo down-elevator of the one gate and for conducting deplaning cargo items to the second down-elevator of said one gate from the aircraft, said first and second cargo elevators being laterally shiftable within the confines of their respective gates, and the power conveyors and their respective transfer devices on said upper level being laterally shiftable into register with their respective first cargo elevators.

2. An industrial and urban airport complex embodying a substantially large tract of land and including a system of aircraft landing and take-off runways surrounding and defining an aircraft loading and unloading apron, a multi-level passenger terminal located on said apron and including a ground floor level, a below grade level, and an upper floor level, means defining a series of passenger and cargo gates arranged peripherally around said terminal substantially at the level of said apron, a first cargo down-elevator for each gate and effective to transfer enplaning cargo items from said upper floor level to substantially the level of the apron, a second cargo down-elevator for each gate and effective to transfer deplaning cargo items from substantially the level of the apron to said below grade level, a cargo building disposed in the immediate vicinity of the apron and within the surrounding confines of said runways, a first in-floor towline for transporting enplaning cargo items from the cargo building to and along said upper floor level, a second in-floor towline for transporting deplaning cargo items from said below grade level of the passenger terminal to the cargo building, said first and second in-floor towlines having associated therewith wheeled carts on which cargo items are carried, said first in-floor towline having a section extending along said upper floor level in spaced relation with the gates, plural means on said upper level of the passenger terminal for selectively transporting enplaning cargo items from the first in-floor towline section to each of the first cargo down-elevators, each of said plural means comprising a unitary, horizontal magazine of parallel side-by-side power roller conveyors extending between one side of said first in-floor towline section and the immediate vicinity of the associated first cargo down-elevator, and a transfer device for each power roller conveyor of the magazine, positioned on the other side of said first in-floor towline section and adapted when operated to slide cargo items from one of said cargo carts of said first in-floor towline section and in alignment with the associated power roller conveyor onto said conveyor for delivery by the latter to said associated first cargo down-elevator, each magazine of power roller conveyors and associated transfer devices being laterally shiftable bodily in unison to bring a selected power roller conveyor thereof into register with its associated first cargo down-elevator, means on said below grade level for transporting deplaning cargo items from each of said second cargo down-elevators to the carts of the second in-floor towline, and reversible conveyor means movably disposed on said apron for selectively conducting enplaning cargo items to an aircraft on said apron and adjacent to one of the gates from the first cargo down-elevator of the one gate and for conducting deplaning cargo items to the second down-elevator of said one gate from the aircraft.

3. An industrial and urban airport complex as set forth in claim 2 and wherein the first and second cargo elevators are laterally shiftable within the confines of their respective gates.

4. An industrial and urban airport complex embodying a large tract of land and including a system of aircraft landing and take-off runways surrounding and defining an aircraft loading and unloading apron, multi-level passenger terminal located on said apron and including a ground floor level, a below grade level, a second floor level, and a third floor level, said third floor level projecting beyond the ground floor level and establishing an overhang which overlies a portion of the apron in the immediate vicinity of the terminal, means defining a series of peripherally-arranged passenger and cargo gates around said terminal, said terminal embodying passenger facilities on the ground and second floor levels, a first cargo down-elevator for each gate extending between the third floor level and the ground floor level and extending through the overhang, said elevator being effective to transfer enplaning cargo items from the third floor level to the apron for delivery to an aircraft disposed on said apron, a second cargo down-elevator for each gate extending between the ground floor level and the below grade level and effective to transfer deplaning cargo items from substantially apron level to said below grade level, said first and second cargo down-elevators being laterally shiftable within the confines of their respective gates, a cargo building disposed in the immediate vicinity of the apron and within the surrounding confines of said runways, a first in-floor towline for transporting enplaning cargo items from the cargo building to and along said third floor level of the passenger terminal, a second in-floor towline for transporting deplaning cargo items from said below grade level to the cargo building, said first and second in-floor towlines having associated therewith wheeled carts for carrying the cargo items, conveying means on said third floor level for selectively conducting enplaning cargo items from certain of the carts of the first towline to the overhang in the vicinity of each of the associated first cargo elevators, plural means on the below grade level for conducting deplaning cargo items from said second cargo down-elevators to the second in-floor towline, each of said plural means comprising a transfer platform of the power roller type for receiving cargo items from the associated second cargo elevator, an elongated power roller shuttle for receiving deplaning cargo items from said transfer platform, a unitary and horizontal magazine of power roller conveyors arranged in parallelism and extending between said shuttle and the second in-floor towline for shifting the cargo items from the shuttle to the second in-floor towline, and selectively operable transfer devices, one for each power roller conveyor of the magazine, for shifting deplaning cargo items from the shuttle onto the magazine of power roller conveyors, and reversible conveyor means movably disposed on said apron for selectively conducting enplaning cargo items to an aircraft on said apron and adjacent to one of the gates from the first cargo down-elevator at the one gate and for conducting deplaning cargo items to the second down-elevator at said one gate from the aircraft.

5. An industrial and urban airport complex embodying a large tract of land and including a system of aircraft landing and take-off runways surrounding and defining an aircraft loading and unloading apron, and a multi-level passenger terminal located on said apron and including a ground floor level, a below grade level, a second floor level, and a third floor level, said third floor level projecting beyond the ground floor level and establishing an overhang which overlies a portion of the apron in the immediate vicinity of the terminal, means defining a series of peripherally-arranged passenger and cargo gates around said terminal, said terminal embodying passenger facilities on the ground and second floor levels, a first cargo down-elevator for each gate extending between the third floor level and the ground floor level and extending through the overhang, said elevator being effective to transfer enplaning cargo items from the third floor level to the apron for delivery to an aircraft disposed on said apron, a second cargo down-elevator for each gate extending between the ground floor level and the below grade level and effective to transfer deplaning cargo items from substantially apron level to said below grade level, said first and second cargo down-elevators being laterally shiftable within the confines of their respective gates, a cargo building disposed in the immediate vicinity of the apron and within the surrounding confines of said runways, a first in-floor towline for transporting enplaning cargo items from the cargo building to and along said third floor level of the passenger terminal, a second in-floor towline for transporting deplaning cargo items from said below grade level to the cargo building, said first and second in-floor towlines having associated therewith wheeled carts for containing the cargo items, plural means on said third floor level of the passenger terminal for selectively conveying enplaning cargo items from the first in-floor towline to those portions of the overhang region of the third floor level that are adjacent to the gates, each of said plural means comprising a power roller conveyor extending between said first in-floor towline and the overhang in the vicinity of the associated first cargo down-elevator and a transfer device for forcibly sliding cargo items from a cargo cart on said first towline onto the power roller conveyor for delivery by the conveyor to the associated first cargo down-elevator, plural means on the below grade level for conducting deplaning cargo items from said second cargo down-elevators to the second in-floor towline, each of said last mentioned plural means comprising a transfer platform of the power roller type for receiving cargo items from the associated second cargo down-elevator, an elongated power roller shuttle for receiving cargo items from said platform, a magazine of power roller conveyors arranged in parallelism and extending between the shuttle and the second in-floor towline for shifting the cargo items from the shuttle to the second in-floor towline, and selectively operable transfer devices, one for each power roller conveyor of the magazine, for shifting the deplaning cargo items from the shuttle onto the magazine power roller conveyors, and reversible conveyor means movably disposed on said apron for selectively conducting enplaning cargo items to an aircraft on said apron and adjacent to one of the gates from the first cargo down-elevator at the one gate and for conducting deplaning cargo items to the second down-elevator at said one gate from the aircraft.

6. An industrial and urban airport complex as set forth in claim 5 and wherein the reversible conveyor means on said apron for conducting cargo items to and from the associated first and second cargo elevators respectively embodies a main mobile roller conveyor having its inner end designed for selective register with said first and second cargo elevators, and a pair of branch mobile roller conveyors adapted to service a winged aircraft on the apron fore and aft of one wing and establishing communication between the main roller conveyor and respective front and rear loading and unloading cargo doors on the aircraft.

7. An industrial and urban airport complex as set forth in claim 6 and wherein said main and branch mobile roller conveyors are capable of effective raising and lowering movement to accommodate cargo doors at different levels of the aircraft, and the first and second cargo elevators likewise are capable of effective raising and lowering movements bodily.

8. An industrial and urban airport complex embodying a tract of land and including a system of aircraft landing and take-off runways surrounding and defining an aircraft loading and unloading apron, a multi-level passenger terminal located on said apron and including a ground floor level and an upper floor level, means defining a passenger and cargo gate at one side of said terminal and substantially at the level of said apron, a cargo down-elevator located at the gate and effective to transfer enplaning cargo items from said upper floor level to substantially the level of the apron for delivery to an aircraft on said apron and adjacent to the gate, an in-floor towline extending along said upper floor level in spaced relation with the gate and having associated therewith wheeled carts for carrying the cargo items, and means on said upper floor level of the passenger terminal for selectively transporting enplaning cargo items from the in-floor towline to the cargo down-elevator, said transporting means comprising a horizontal magazine of parallel side-by-side power roller conveyors extending between one side of the in-floor towline and the immediate vicinity of said cargo down-elevator, and a transfer device for each power roller conveyor of the magazine, positioned on the other side of said in-floor towline and adapted when operated to slide cargo items from a cargo cart of the in-floor towline and in alignment with the associated power roller conveyor onto said associated conveyor for delivery by the latter to said first cargo down-elevator, said magazine of power roller conveyors and the associated transfer devices being laterally shiftable bodily in unison in order to bring a selected power roller conveyor into register with said cargo down-elevator.

9. An industrial and urban airport complex as set forth in claim 8 and wherein the cargo down-elevator is laterally shiftable within the confines of said gate.

10. An industrial and urban airport complex according to claim 9 and wherein the cargo down-elevator is vertically adjustable and the portion of the magazine that is adjacent to said elevator embodies a hinged, ramp-like, conveyor extension which is capable of being tilted upwards and downwards in connection with vertical adjustment of said elevator.

11. An industrial and urban airport complex embodying a tract of land and including a system of aircraft landing and take-off runways surrounding and defining an aircraft loading and unloading apron, a multi-level passenger terminal located on said apron and including a ground floor level, a below grade level, and an upper floor level, means defining a passenger and cargo gate at one side of said terminal and substantially at the level of said apron, a first cargo down-elevator located at the gate and effective to transfer enplaning cargo items from said upper floor level to substantially the level of the apron for delivery to an aircraft on said apron and adjacent to the gate, a second cargo down-elevator located at the gate and effective to transfer deplaning cargo items arriving on the aircraft, from substantially the level of the apron to said below grade level, an in-floor towline extending along said upper floor level in spaced relation with the gate and having associated therewith wheeled carts for carrying the enplaning cargo items, a second in-floor towline extending along said below grade level in spaced relation with the gate, means on said upper floor level of the passenger terminal for selectively transporting enplaning cargo items from the first in-floor towline to the first cargo down-elevator, said transporting means comprising a horizontal magazine of parallel, side-by-side, power roller conveyors extending from one side of said first in-floor towline to the immediate vicinity of said first cargo down-elevator, and a transfer device for each power roller conveyor of the magazine positioned on the other side of said first in-floor towline and adapted when operated to slide cargo items from a cart of the first in-floor towline and in alignment with the associated power roller conveyor onto said associated conveyor for delivery by the latter to said first cargo down-elevator, said magazine of power roller conveyors and the associated transfer devices being laterally shiftable bodily in unison in order to bring a selected power roller conveyor into register with said first cargo down-elevator, and means on said below grade level of the passenger terminal for transporting deplaning cargo items from the second cargo down-elevator to said second in-floor towline, said last-mentioned means comprising a power roller transfer platform for receiving deplaning cargo items from said second cargo down-elevator, and a conveyor ramp section for conveying deplaning cargo items from the platform to said second in-floor towline.

12. An industrial and urban airport complex as set forth in claim 11 and wherein the first and second cargo down-elevators are laterally shiftable within the confines of said gate.

13. An industrial and urban airport complex as set forth in claim 11 and wherein the first cargo down-elevator is vertically adjustable and the portion of the magazine that is adjacent to said elevator embodies a hinged, ramp-like, conveyor extension which is capable of being tilted upwards and downwards in connection with vertical adjustment of said elevator.

14. An industrial and urban airport complex embodying a tract of land and including a system of aircraft landing and take-off runways surrounding and defining an aircraft loading and unloading apron, a multi-level passenger terminal located on said apron and including a ground floor level, a below grade level, and an upper floor level, means defining a passenger and cargo gate at one side of said terminal and substantially at the level of said apron, a first cargo down-elevator located at the gate and effective to transfer enplaning cargo items from said upper floor level to substantially the level of the apron for delivery to an aircraft on said apron and adjacent to the gate, a second cargo down-elevator located at the gate and effective to transfer deplaning cargo items arriving on the aircraft, from substantially the level of the apron to said below grade level, an in-floor towline extending along said upper floor level in spaced relation with the gate for carrying enplaning cargo items, a second in-floor towline extending along said below grade level in spaced relation with the gate, means on said upper floor level of the passenger terminal for selectively transporting enplaning cargo items from the first in-floor towline to the first cargo down-elevator, said transporting means comprising a horizontal magazine of parallel, side-by-side, power roller conveyors extending from one side of said first in-floor towline to the immediate vicinity of said first cargo down-elevator, and transfer means on the other side of said first in-floor towline for shifting cargo items from the first in-floor towline onto the power conveyors of the magazine for selective delivery by said conveyors to said first cargo down-elevator, said magazine of power roller conveyors being laterally shiftable in order to bring a selected power roller conveyor into register with said first cargo down-elevator, and means on said below grade level of the passenger terminal for transporting deplaning cargo items from the second cargo down-elevator to said second in-floor towline, said last-mentioned means comprising a power roller transfer platform for receiving deplaning cargo items from said second cargo down-elevator, and a conveyor ramp section for conveying deplaning cargo items from the platform to said second in-floor towline.

* * * * *